US012718027B2

(12) United States Patent
Compton et al.

(10) Patent No.: US 12,718,027 B2

(45) Date of Patent: Aug. 25, 2026

(54) SPEECH SIGNAL PROCESSING USING ARTIFICIAL INTELLIGENCE

(71) Applicant: Curai, Inc., Palo Alto, CA (US)

(72) Inventors: Rhys Compton, Palo Alto, CA (US); Xavier Amatriain, Los Gatos, CA (US); Li Deng, Palo Alto, CA (US); Anitha Kannan, Saratoga, CA (US); Ilya Valmianski, Palo Alto, CA (US); Jian Zhu, Palo Alto, CA (US)

(73) Assignee: CURAI, INC., Palo Alto, CA (US)

( * ) Notice: Subject to any disclaimer, the term of this patent is extended or adjusted under 35 U.S.C. 154(b) by 158 days.

(21) Appl. No.: 18/224,406

(22) Filed: Jul. 20, 2023

(65) Prior Publication Data

US 2024/0028838 A1 Jan. 25, 2024

Related U.S. Application Data

(60) Provisional application No. 63/417,950, filed on Oct. 20, 2022, provisional application No. 63/400,665, filed on Aug. 24, 2022, provisional application No. 63/390,691, filed on Jul. 20, 2022.

(51) Int. Cl.
*G06F 40/35* (2020.01)
*G06F 40/40* (2020.01)

(52) U.S. Cl.
CPC .............. *G06F 40/35* (2020.01); *G06F 40/40* (2020.01)

(58) Field of Classification Search
CPC ................................ G06F 40/35; G06F 40/40
See application file for complete search history.

(56) References Cited

U.S. PATENT DOCUMENTS

| | | | | |
|---|---|---|---|---|
| 9,812,151 | B1 * | 11/2017 | Amini | G06T 13/40 |
| 11,580,764 | B2 * | 2/2023 | Malkiel | G06F 16/93 |
| 11,599,731 | B2 * | 3/2023 | Galitsky | G06F 40/253 |
| 11,967,315 | B2 * | 4/2024 | Apsingekar | G10L 15/197 |
| 12,394,408 | B1 * | 8/2025 | Chadwick | A61B 5/4803 |
| 2024/0029714 | A1 * | 1/2024 | Chintagunta | G06F 40/30 |
| 2024/0212811 | A1 * | 6/2024 | Vogler | G06N 3/084 |

FOREIGN PATENT DOCUMENTS

| | | | | |
|---|---|---|---|---|
| WO | WO-2021081418 A1 * | 4/2021 | | G10L 25/63 |
| WO | WO-2022251472 A1 * | 12/2022 | | A61B 5/741 |

OTHER PUBLICATIONS

Chen et al., A Simple Framework for Contrastive Learning of Visual Representations, arXiv:2002.05709, 2020 (Year: 2020).*

(Continued)

*Primary Examiner* — Bhavesh M Mehta
*Assistant Examiner* — Eunice Lee
(74) *Attorney, Agent, or Firm* — SCHWEGMAN LUNDBERG & WOESSNER, P.A.

(57) ABSTRACT

In one aspect, a method of speech signal processing using artificial intelligence, includes receiving, with at least one processor, a digital speech signal, converting, with the at least one processor, the digital speech signal to text, performing self-alignment pre-training of an encoder on entities and their synonyms, label attention training the pretrained encoder by aligning label-text joint representation to that of label synonym-text joint representations, and identifying, with the trained encoder, entities in a span in the text.

19 Claims, 14 Drawing Sheets

(56) References Cited

OTHER PUBLICATIONS

Greenberg et al., Marginal Likelihood Training of BILSTM-CRF for Biomedical Named Entity Recognition from Disjoint Label Sets, Proceedings of the 2018 Conference on Empirical Methods in Natural Language Processing, 2018 (Year: 2018).*
Wang et al., Characterization of MPC-based Private Inference for Transformer-based Models, 2022 IEEE International Symposium on Performance Analysis of Systems and Software, 2022 (Year: 2022).*
Gaonkar et al., Modeling Label Semantics for Predicting Emotional Reactions, arXiv:2006.05489, 2020 (Year: 2020).*
Liu et al., Self-Alignment Pretraining for Biomedical Entity Representations, Proceedings of the 2021 Conference of the North American Chapter of the Association for Computational Linguistics, Human Language Technologies, 2021 (Year: 2021).*
Pei et al., Personalized Re-ranking for Recommendation, Proceedings of the 13th ACM Conference on Recommender Systems, 2019 (Year: 2019).*
Hauser et al., State Space Representations of Deep Neural Networks, arXiv:1806.03751, 2019 (Year: 2019).*
Wang et al., (Characterization of MPC-based Private Inference for Transformer-based Models, 2022 IEEE International Symposium on Performance Analysis of Systems and Software (ISPASS), 2022 (Year: 2022).*
Sankararaman, et al., BayesFormer: Transformer with Uncertainty Estimation, arXiv:2206.00826, 2022 (Year: 2022).*
AI, Qingyao, et al., "Learning Groupwise Multivariate Scoring Functions Using Deep Neural Networks", In: Proceed-ings of the 2019 Acm Sigir international conference on theory of information retrieval, (2019), 8 pgs.
Alan, Aronson R, "Effective mapping of biomedical text to the umls metathesaurus: the metamap program", In Proceedings of the AMIA Symposium, p. 17. American Medical Informatics Association, (2001), 5 pgs.
Ali, Mottaghi, et al., "Medical symptom recognition from patient text: An active learning approach for long-tailed multilabel distributions", CoRR, abs/2011.06874, (2020), 14 pgs.
Allen, James F, et al., "A robust system for natural spoken dialogue", In Proceedings of the Annual Meeting of the Association for Computational Linguistics, pp. 62-70, (Jun. 18, 1996), 9 pgs.
Andre, Esteva, et al., "A guide to deep learning in healthcare", Nature medicine, 25(1), (2019), 6 pgs.
Aust, H, et al., "The philips automatic train timetable information system", Speech Communication, 17, (1995), 249-262.
Bahdanau, Dzmitry, et al., "Neural Machine Translation by Jointly Learning to Align and Translate", arXiv:1409.0473v7, International Conference on Representation Learning, (2015), 1-15.
Beltagy, Iz, et al., "Longformer: The Long-Document Transformer", arXiv preprint arXiv:2004.05150, (2020), 17 pgs.
Bo, Lin, et al., "A knowledge graph based health assistant", Al for Social Good workshop at NeurIPS, Vancouver, Canada, (2019), 5 pgs.
Bodenreider, Olivier, "The Unified Medical Language System (UMLS): Integrating Biomedical Terminology", Nucleic Acids Research, 32:0267-0270, (2004), 4 pgs.
Bohan, Li, et al., "On the sentence embeddings from pre-trained language models", In EMNLP, (Nov. 2, 2020), 12 pgs.
Brown, Tom B., et al., "Language Models Are Few-Shot Learners", Conference On Neural Information Processing Systems, (2020), 25 pgs.
Bruce, Nguyen, et al., "Fine-tuning pretrained language models with label attention for biomedical text classification", [Online]. Retrieved from the Internet: <https://arxiv.org/abs/2108.11809>, (2021), 5 pgs.
Burges, Christopher, et al., "Learning to Rank using Gradient Descent", in the Proceedings of the 22nd International Conference on Machine Learning, (Aug. 2005), 8 pgs.
Burges, Christopher, et al., "Learning to Rank with Nonsmooth Cost Functions", In Proceedings of the Advances in Neural Information Processing Systems, (Dec. 2006), 8 pgs.
Canadian Institute for Health, Information, "ICD-10: International Statistical Classification of Diseases and Related Health Problems: Tenth Revision", WHO, (2009), 1068 pgs.
Cao, Z., et al., "Learning to rank: from pairwise approach to listwise approach", In: Proceedings of the 24th international conference on Machine learning, (2007), 9 pgs.
Carol, Friedman, et al., "Architectural requirements for a multipurpose natural language processor in the clinical environment", In Proceedings of the Annual Symposium on Computer Application in Medical Care, American Medical Informatics Association, (1995), 5 pgs.
Celikyilmaz, Asli, et al., "Deep learning in spoken and text-based dialogue systems", Chapter 3 of Book: Deep Learning in Natural Language Processing, (2018), 30 pgs.
Chen, Shu, et al., "Meddialog: A large-scale medical dialogue dataset", CoRR, (Jul. 7, 2020), 6 pgs.
Chen, Ting, et al., "A Simple Framework for Contrastive Learning of Visual Representations", arXiv:2002.05709v3 [cs.LG], (Jul. 1, 2020), 20 pgs.
Chen, Xiaoyang, et al., "Co-bert: A context-awarebert retrieval model incorporating local and query-specific context", arXiv preprint arXiv:2104.08523, (2021), 11 pgs.
Chen, Yun-Nung, et al., "End-to-end memory networks with knowledge carryover for multi-turn spoken language understanding", In Proceedings of Interspeech, (2016), 5 pgs.
Chen, Zhiyu, et al., "Few-shot NLG with pre-trained language model", (Apr. 19, 2020), 8 pgs.
Chintagunta, Jai, et al., "Medically aware gpt-3 as a data generator for medical dialogue summarization", Machine Learning for Healthcare, Proceedings of Machine Learning Research 126:1-18, 2021., (2021), 18 pgs.
Choromanski, Colwell, et al., "Rethinking Attention with Performers", (Oct. 23, 2020), 38 pgs.
Compton, Rhys, et al., "Medcod: A medically-accurate, emotive, diverse, and controllable dialog system", In Proceedings of Machine Learning for Health, vol. of Proceedings of Machine Learning Research, PMLR, (Nov. 17, 2021), 20 pgs.
Da, Kingma, et al., "A method for stochastic optimization", arXiv preprint arXiv:1412.6980, (2014).
Deng, Li, et al., "Deep learning in conversational language understanding", Springer Nature Singapore Pte Ltd. 2018, In Chapter 2 of Book: Deep Learning in Natural Language Processing,, (2018), 338 pgs.
Deng, Li, et al., "Deep Learning: From speech recognition to language and multimodal processing", In APSIPA Transactions on Signal and Information Processing (Cambridge University Press), (Jan. 19, 2016), 15 pgs.
Deng, Li, et al., "Deep Learning: Methods and Applications", In Journal of Foundations and Trends in Signal Processing, vol. 7, Issue 34, <http://dx.doi.org/10.1561/2000000039> Full Text, (Jun. 2014), 56 pgs.
Deng, Li, et al., "Speech Processing: A Dynamic and Optimization-Oriented Approach", Marcel Dekker Inc., (2003), 66 pgs.
Devlin, Jacob, et al., "BERT: Pre-training of Deep Bidirectional Transformers for Language Understanding", In: Proceedings of the 2019 Conference of the North American Chapter of the Association for Computational Linguistics: Human Language Technologies, vol. 1, [Online]. Retrieved from the Internet: < URL: https://doi.org/10.18653/v1/N19-1423,>, (2019), 16 pgs.
Dhingra, Bhuwan, et al., "Towards End-to-end reinforcement learning of dialogue agents for information access", arXiv preprintrXiv:1609.00777, 2016, (Apr. 20, 2017), 12 pgs.
Du, Nan, et al., "Extracting symptoms and their status from clinical conversations", In Proceedings of the 57th Annual Meeting of the Association for Computational Linguistics, (Jun. 5, 2019), 11 pgs.
Du, Nan, et al., "Learning to infer entities, properties and their relations from clinical conversations", CoRR, (Aug. 30, 2019), 12 pgs.
Enarvi, Seppo, et al., "Generating medical reports from patient-doctor conversations using sequence-to-sequence models", In Pro-

(56) References Cited

OTHER PUBLICATIONS ceedings of the First Workshop on Natural Language Processing for Medical Conversations, Association for Computational Linguistics, pp. 22-30, (Jul. 2020), 9 pgs.
Fabio, Maresca, et al., "Ontoaugment: Ontology matching through weakly-supervised label augmentation", In Proceedings of the 19th ACM Conference on Embedded Networked Sensor Systems, SenSys '21 New York, NY, USA, Association for Computing Machinery, (2021), 7 pgs.
Fangyu, Liu, et al., "Fast, effective, and self-supervised: Transforming masked language models into universal lexical and sentence encoders", In EMNLP, (2021), 18 pgs.
Fredrik, Carlsson, et al., "Semantic re-tuning with contrastive tension", International Conference on Learning Representations, 7, (2021), 21 pgs.
Gao, Tianyu, et al., "SimCSE: Simple Contrastive Learning of Sentence Embeddings", Empirical Methods in Natural Language Processing (EMNLP), (2021), 17 pgs.
Gorin, a L, et al., "How may i help you?", Speech Communication, 23, (1997), 15 pgs.
Gu, A, et al., "Efficiently modeling long sequences with structured state spaces", In: International Conference on Learning Representations, (2021), 32 pgs.
Gu, Albert, et al., "On the Parameterization and Initialization of Diagonal State Space Models", arXiv preprint arXiv:2206.11893, (2022), 23 pgs.
Guo, Mandy, et al., "LongT5: Efficient Text-To-Text Transformer for Long Sequences", arXiv preprint arXiv:2112.07916, (2021), 13 pgs.
Guoyin, Wang, et al., "Joint embedding of words and labels for text classification", In Proceedings of the 56th Annual Meeting of the Association for Computational Linguistics, Melbourne, Australia, Association for Computational Linguistics, (Jul. 2018), 11 pgs.
Hakkani-Tur, Dilek, et al., "Multi-Domain Joint Semantic Frame Parsing using Bi- directional RNN-LSTM", In Proceedings of Interspeech, pp. 715-719, (2016), 5 pgs.
Hampton, J. R., et al., "Relative contributions of history-taking, physical examination, and laboratory investigation to diagnosis and management of medical outpatients", Br Med J 2(5969), (1975), 4 pgs.
He, X D, et al., "Why word error rate is not a good metric for speech recognizer training for the speech translation task?", In Proc. ICASSP, Prague, (2011), 4 pgs.
He, Xiaodong, et al., "Speech-centric information processing: An optimization-oriented approach", In IEEE, (2013), 20 pgs.
Hinton, Geoffrey, et al., "Deep Neural Networks for Acoustic Modeling in Speech Recognition: the Shared Views of Four Research Groups", IEEE Signal Processing Magazine, 29(6), (Nov. 2012), 82-97.
Hochreiter, S., et al., "Long Short-Term Memory", Neural computation 9(8), (1997), 1735-1780.
Hosseini-Asl, Ehsan, et al., "A simple language model for task-oriented dialogue", CORR, (2020), 13 pgs.
Hotelling, Harold, "Analysis of a Complex of Statistical Variables into Principal Components", Journal of Educational Psychology, vol. 24(6), (1933), 417-441.
Hu, J., et al., "Squeeze-and-Excitation Networks", 2018 IEEE/CVF Conference on Computer Vision and Pattern Recognition, Salt Lake City, UT, USA, doi:10.1109/CVPR.2018.00745, (2018), 7132-7141.
Huang, Po-Sen, et al., "Learning Deep Structured Semantic Models for Web Search using clickthrough Data", In Proceedings of the 22nd ACM international conference on Conference on information & knowledge management, (Oct. 27, 2013), 2333-2338.
Huang, Xuedong, et al., "An overview of modern speech recognition", In Handbook of Natural Language Processing, Second Edition, Chapter 15, (2010), 29 pgs.
Humeau, Samuel, et al., "Poly-encoders: Architectures and pre-training strategies for fast and accurate multi-sentence scoring", In: International Conference on Learning Representations, (2019), 14 pgs.
Jarvelin, et al., "IR evaluation methods for retrieving highly relevant documents", Proceedings of the 23rd Annual International Acm Sigir Conference on Research and Development in Informaiton, [[Online]. Retrieved from the Internet: < URL: https://doi.org/10.1145/345508.345545,https://doi.org/10.1145/345508.34554>, (2000), 8 pgs.
Jason, Fries A, et al., "Ontology-driven weak supervision for clinical entity classification in electronic health records", Nature Communications, 12, (2021), 24 pgs.
Jian, Tang, et al., "Pte: Predictive text embedding through large-scale heterogeneous text networks", In Proceedings of the 21th Acm Sigkdd international conference on knowledge discovery and data mining, (2015).
Jinhyuk, Lee, et al., "BioBERT: a pre-trained biomedical language representation model for biomedical text mining", Bioinformatics, 36(4), (2019), 7 pgs.
Kannan, Anitha, et al., "COVID-19 in differential diagnosis of online symptom assessments", CoRR, abs/2008.03323, (Nov. 30, 2020), 10 pgs.
Kao, Hao-Cheng, et al., "Context-aware symptom checking for disease diagnosis using hierarchical reinforcement learning", In AAAI, (2018), 9 pgs.
Keskar, Nitish Shirish, et al., "Ctrl: A conditional transformer language model for controllable generation", arXiv:1909.05858v2, Sep. 20, 2019., (2019), 18 pgs.
Khosla, Prannay, et al., "Supervised Contrastive Learning", arXiv:2004.11362v5 [cs.LG], (Mar. 10, 2021), 23 pgs.
Khosla, Sopan, et al., "Medfilter: Improving extraction of task-relevant utterances through integration of discourse structure and ontological knowledge", In Proceedings of the Conference on Empirical Methods in Natural Language Processing (EMNLP), (2020), 17 pgs.
Kitaev, Nikita, et al., "Reformer: The Efficient Transformer", In: International Conference on Learning Representations, (2019), 12 pgs.
Koby, Crammer, et al., "Automatic code assignment to medical text", In Proceedings of the Workshop on BioNLP 2007: Biological, Translational, and Clinical Language Processing, BioNLP '07, Association for Computational Linguistics, (2007), 8 pgs.
Lecun, Y., et al., "Backpropagation Applied to Handwritten Zip Code Recognition", Neural Computation, 1(4), (1989), 541-555.
Levenshtein, V. I., "Binary Codes Capable of Correcting Deletions, Insertions, and Reversals", Soviet Physics—Doklady, 10(8), (1966), 707-710.
Li, Jiwei, et al., "A Persona-Based Neural Conversation Model", ACL, (Jun. 8, 2016), 10 pgs.
Lin, J., et al., "Pretrained transformers for text ranking: Bert and beyond", Synthesis Lectures on Human Language Technologies 14(4), (2021), 204 pgs.
Lin, Shuai, et al., "Graph-evolving meta-learning for low-resource medical dialogue generation", CoRR, (Dec. 22, 2020), 9 pgs.
Lipton, Zachary C, et al., "Efficient dialogue policy learning with bbq-networks", arXiv.org, (2016), 13 pgs.
Liu, Guanxiong, et al., "Clinically Accurate Chest X-Ray Report Generation", CoRR., (2019), 20 pgs.
Liu, Jiachang, et al., "What makes good in-context examples for gpt-3?", arXiv:2101.06804v1, Jan. 17, 2021, (2021), 12 pgs.
Liu, T. Y., et al., "Learning to Rank for Information Retrieval", Foundations and Trends® in Information Retrieval 3(3), (2009), 36 pgs.
Liu, Yinhan, et al., "Roberta: A robustly optimized bert pretraining", arXiv preprint arXiv:1907.11692, (2019), 13 pgs.
Loshchilov, Ilya, et al., "Decoupled Weight Decay Regularization", In 7th International Conference on Learning Representations, ICLR New Orleans, La, USA, (2018), 19 pgs.
Mehta, Harsh, et al., "Long Range Language Modeling via Gated State Spaces", arXiv preprint arXiv:2206.13947, (2022), 15 pgs.

(56) References Cited

OTHER PUBLICATIONS

Mesnil, G, et al., "Using recurrent neural networks for slot filling in spoken language understanding", IEEE/ACM Transactions on Audio, Speech, and Language Processing, vol. 3, No. 3, (Mar. 23, 2015), 530-539.
Miller, Randolph A, et al., "Quick Medical Reference (QMR): An Evolving, Microcomputer-Based Diagnostic Decision-Support Program for General Internal Medicine", Proceedings of the Annual Symposium on Computer Application in Medical Care, (Nov. 1989), 947-948.
Min, Sewon, et al., "Joint Passage Ranking for Diverse Multi-Answer Retrieval", In: Proceedings of the 2021 Conference on Empirical Methods in Natural Language Processing, [Online]. Retrieved from the Internet: <URL: https://doi.org/10.18653/v1/2021.emnlpmain. 560,https://aclanthology.org/2021.emnlp- main.560>, (2021), 12 pgs.
Mullenbach, James, et al., "Explainable Prediction of Medical Codes from Clinical Text", In Proceedings of the 2018 Conference of the North American Chapter of the Association for Computational Linguistics: Human Language Technologies, vol. 1, (Association for Computational Linguistics, New Orleans, Louisiana), (Jun. 2018), 1101-1111.
No'Emie, Elhadad, et al., "Semeval-2015 task 14: Analysis of clinical text", In Proceedings of the 9th International Workshop on Semantic Evaluation (SemEval 2015), Association for Computational Linguistics, (Jun. 2015).
Nogueira, Rodrigo, et al., "Document Ranking with a Pretrained Sequence-to- Sequence Model", In: Findings of the Association for Computational Linguistics: EMNLP 2020, [Online]. Retrieved from the Internet: <URL:https://doi.org/10.18653/v1/2020.findings- emnlp. 63, https://aclanthology.org/2020.findings-emnlp.63>, (2020), 11 pgs.
Nogueira, Rodrigo, et al., "Multi-stage document ranking with bert", arXiv preprint arXiv:1910.14424, (2019), 13 pgs.
Nogueira, Rodrigo, et al., "Passage re-ranking with bert", arXiv preprint arXiv: 1901.04085, (2019), 5 pgs.
Oord, Aaron Van Den, et al., "Representation learning with contrastive predictive coding", arXiv preprint arXiv:1807.03748, (2018), 13 pgs.
Pagad, Naveen S, et al., "Clinical named entity recognition methods: An overview", International Conference on Innovative Computing and Communications. Springer Singapore, (2022), 812 pgs.
Paranjape, Ashwin, et al., "Neural Generation Meets Real People: Towards Emotionally Engaging Mixed-Initiative Conversations", CoRR, abs/2008.12348, (2020), 27 pgs.
Pearson, Karl, "Liii. on lines and planes of closest fit to systems of points in space", The London, Edinburgh, and Dublin philosophical magazine and journal of science, 2(11), (1901), 559-572.
Pestian, John P, et al., "A shared task involving multi-label classification of clinical free text", In Biological, translational, and clinical language processing, Prague, Czech Republic Association for Computational Linguistics, (Jun. 2007), 8 pgs.
Pobrotyn, Przemyslaw, et al., "Neuralndcg: Direct optimisation of a ranking metric via differentiable relaxation of sorting", ArXiv abs/2102.07831, (2021), 7 pgs.
Prabhu, Viraj, et al., "Open set medical diagnosis", CoRR, abs/1910.02830, (2019), 10 pgs.
Pradeep, Ronak, et al., "The Expando-Mono-Duo Design Pattern for Text Ranking with Pretrained Sequence-to-Sequence Models", arXiv preprint arXiv:2101.05667, (2021), 23 pgs.
Qin, Tao, et al., "A general approximation framework for direct optimization of information retrieval measures", Information retrieval 13(4), (2010), 23 pgs.
Raffel, Colin, et al., "Exploring the limits of transfer learning with a unified text-to-text transformer", Journal of Machine Learning Research 21, (2020), 67 pgs.
Rashkin, Hannah, et al., "Towards Empathetic Open-domain Conversation Models: a New Benchmark and Dataset", Proceedings of the 57th Annual Meeting of the Association for Computational Linguistics, Florence, Italy, (2018), 18 pgs.
Ratner, Alexander J, et al., "Data programming: Creating large training sets, quickly", Advances in neural information processing systems, 29, (2016), 27 pgs.
Ratner, Alexander, et al., "Snorkel: Rapid training data creation with weak supervision", In Proceedings of the VLDB Endowment. International Conference on Very Large Data Bases, vol. 11 NIH Public Access, (2017), 49 pgs.
Ravuri, Murali, et al., "Learning from the experts: From expert systems to machine learned diagnosis models", Machine Learning for Health Care, Proceedings of Machine Learning Research 85, (2018), 16 pgs.
Reimers, Nils, et al., "Sentence-BERT: Sentence Embeddings using Siamese BERT- Networks", In Proceedings of the 2019 Conference on Empirical Methods in Natural Language Processing and the 9th International Joint Conference on Natural Language Processing, (2019), 11 pgs.
Rojowiec, Robin, et al., "Intent recognition in doctor-patient interviews", Proceedings of the 12th Conference on Language Resources and Evaluation (LREC 2020), (May 11-16, 2020), 702-709.
Rudnicky, Alexander, "An agenda-based dialog management architecture for spoken language systems", In IEEE Automatic Speech Recognition and Understanding Workshop, vol. 13, (1999), 4 pgs.
Savova, Guergana K, et al., "Mayo clinical text analysis and knowledge extraction system (ctakes): architecture, component evaluation and applications", Journal of the American Medical Informatics Association, 17(5), (2012), 8 pgs.
Selvaraj, Sai P, et al., "Medication regimen extraction from clinical conversations", CORR, (2019), 13 pgs.
Simpson, A., et al., "Black box and glass box evaluation of the sundial system", Third European Conference on Speech Communication and Technology, (1993), 4 pgs.
Soltau, Hagen, et al., "Understanding Medical Conversations: Rich Transcription, Confidence Scores & Information Extraction", CoRR, (2021), 5 pgs.
Steven, Bethard, et al., "Semeval-2016 task 12: Clinical tempeval", In Proceedings of the 10th International Workshop on Semantic Evaluation, San Diego, California, Association for Computational Linguistics, (Jun. 2016), 11 pgs.
Styler, William F, et al., "Temporal annotation in the clinical domain", TACL, 2, [Online]. Retrieved from the Internet: <https://tacl2013.cs.columbia.edu/ojs/index.php/tacl/article/view/305>, (2014), 12 pgs.
Tamine, Lynda, et al., "Semantic information retrieval on medical texts: Research challenges, survey, and open issues", ACM Comput. Surv., 54(7), (2021), 37 pgs.
Tang, Kai-Fu, et al., "Inquire and Diagnose: Neural Symptom Checking Ensemble using Deep Reinforcement Learning", In: NIPS Workshop on Deep Reinforcement Learning, (2016), 9 pgs.
Tay, Yi, et al., "Long range arena: A benchmark for efficient transformers", In: International Conference on Learning Representations, (2020), 16 pgs.
Thakur, Nandan, et al., "Augmented sbert: Data augmentation method for improving bi- encoders for pairwise sentence scoring task", In: Proceedings of the 2021 Conference of the North American Chapter of the Association for Computational Linguistics: Human Language Technologies, (2021), 15 pgs.
Thanh, Vu, et al., "A label attention model for icd coding from clinical text", In Proceedings of the Twenty-Ninth International Conference on International Joint Conferences on Artificial Intelligence, (2021), 7 pgs.
Tur, G., et al., "Intent Determination and Spoken Utterance Classification, Chapter 4 in Book: Spoken Language Understanding", John Wiley and Sons, New York, NY, (2011).
Tur, Gokhan, et al., "Towards deeper understanding: Deep convex networks for semantic utterance classification", In IEEE International Conference on Acoustics, Speech and Signal Processing (ICASSP), (2012), 5045-5048.
Valmianski, Ilya, et al., "Smarttriage: A system for personalized patient data capture, documentation generation, and decision support", In Proceedings of Machine Learning for Health, vol. 158 of Proceedings of Machine Learning Research PMLR, (Dec. 4, 2021), 22 pgs.

(56) References Cited

OTHER PUBLICATIONS

Vaswani, Ashish, et al., "Attention Is All You Need", Advances in neural information processing systems, (2017), 11 pgs.
Veena, Mayya, et al., "LATA—label attention transformer architectures for icd-10 coding of unstructured clinical notes", In 2021 IEEE Conference on Computational Intelligence in Bioinformatics and Computational Biology (CIBCB), (2021), 1-7.
Vinyals, Oriol, et al., "A Neural Conversational Model", Proceedings of the 31st International Conference on Machine Learning, Lille, France, JMLR: W&Cp vol. 37, (Jul. 22, 2015), 8 pgs.
Wang, Sinong, et al., "Linformer: Self-Attention with Linear Complexity", arXiv preprint arXiv:2006.04768, (2020), 12 pgs.
Wang, Yeyi, et al., "Semantic Frame Based Spoken Language Understanding, Chapter 3", John Wiley and Sons, New York, NY, (2011).
Wang, Ye-Yi, et al., "Spoken language understanding", IEEE Signal Processing Magazine, vol. 22, No. 5, pp. 16-31, 2005, (2005), 36 pgs.
Watson, D., et al., "Health interview responses compared with medical records", Vital and health statistics. Ser. 1, Programs and collection procedures (3), 1-74, (1965), 81 pgs.
Wendy, Chapman W, et al., "A simple algorithm for identifying negated findings and diseases in discharge summaries", Journal of biomedical informatics, 34, (Oct. 2001), 11 pgs.
Weston, Jason, et al., "Wsabie: Scaling up to large vocabulary image annotation", In Proceedings of the Twenty-Second International Joint Conference on Artificial Intelligence - vol. vol. Three, IJCAI'11 Aaai Press, (2011), 7 pgs.
Wolf, Thomas, et al., "Transformers: State-of-the-art natural language processing", In: Proceedings of the 2020 conference on empirical methods in natural language processing: system demonstrations, (2020), 8 pgs.
Wu, Chien-Sheng, et al., "Tod-bert: Pre-trained natural language understanding for task- oriented dialogue", In Bonnie Webber, Trevor Cohn, Yulan He, and Yang Liu, editors, EMNLP, Association for Computational Linguistics, (2020), 917-929.
Xia, Fen, et al., "Listwise approach to learning to rank: theory and algorithm", In: Proceedings of the 25th international conference on Machine learning, (2008), 8 pgs.
Xiong, Yunyang, et al., "Nystromformer: A Nystrom-Based Algorithm for Approximating Self-Attention", In: Proceedings of the AAAI Conference on Artificial Intelligence. vol. 35, 14138-14148, (2021), 10 pgs.
Yang, Liu, et al., "Effective convolutional attention network for multi-label clinical document classification", In Proceedings of the 2021 Conference on Empirical Methods in Natural Language Processing, Punta Cana, Dominican Republic, Association for Computational Linguistics, [Online]. Retrieved from the Internet: <https://aclanthology.org/2021.emnlp-main.481>, (Nov. 2021), 13 pgs.
Young, Steve, et al., "The Hidden Information State model: A practical framework for POMDP-based spoken dialogue management", Computer Speech & Language, 24(2), (2010), 150-174.
Yu, D, et al., "Automatic Speech Recognition: A Deep Learning Approach", Springer, (2015), 329 pgs.
Yu, Dong, et al., "Handbook of Research on User Interface Design and Evaluation for Mobile Technology", IGI Global, (pp. 461-477), (2008), 19 pgs.
Zaheer, Manzil, et al., "Big Bird: Transformers for Longer Sequences", Advances in Neural Information Processing Systems 33, 17283-17297, (2020), 42 pgs.
Zerveas, G., et al., "Coder: An efficient framework for improving retrieval through contextualized document embedding reranking", arXiv preprint arXiv:2112.08766, (2021), 19 pgs.
Zhang, Yizhe, et al., "A state-of-the-art large-scale pretrained response generation model", [Online]. Retrieved from the Internet: <URL: https://huggingface.co/microsoft/DialoGPT-medium>, (accessed Jul. 2021), (2021), 3 pgs.
Zhang, Yizhe, et al., "Dialogpt: Large-scale generative pre-training for conversational response generation", (2019), 10 pgs.

* cited by examiner

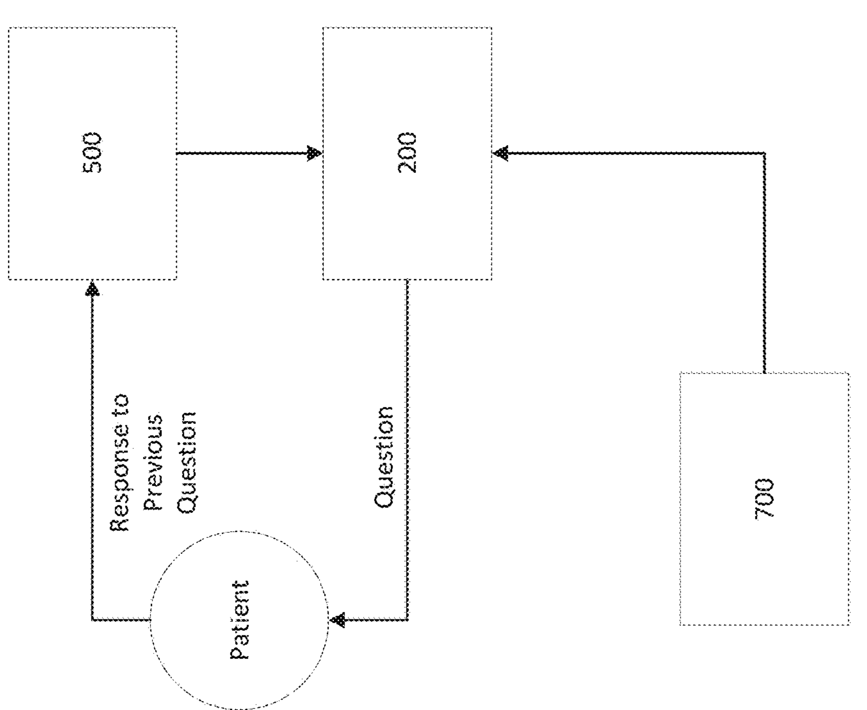
FIG. 1

FIG. 6 (*b*) After self-alignment pretraining positives
negatives

FIG. 6(*a*) Before self-alignment pretraining

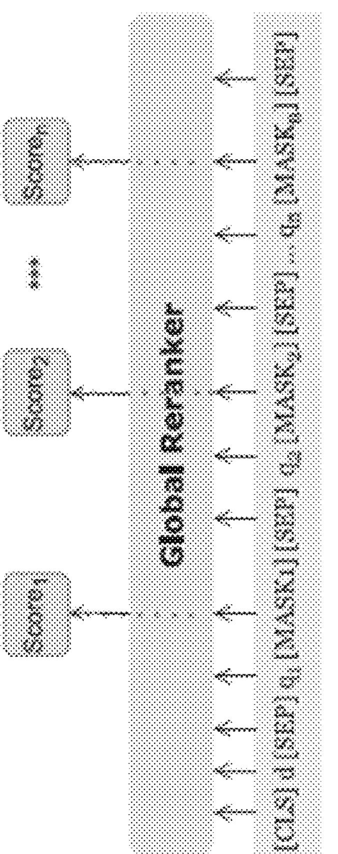
FIG. 7

RECEIVE, WITH AT LEAST ONE PROCESSOR, A DIGITAL SPEECH SIGNAL 902

CONVERT, WITH THE AT LEAST ONE PROCESSOR, THE DIGITAL SPEECH SIGNAL TO TEXT 904

PERFORM SELF-ALIGNMENT PRE-TRAINING OF AN ENCODER ON ENTITIES AND THEIR SYNONYMS 906

LABEL ATTENTION TRAIN THE PRETRAINED ENCODER BY ALIGNING LABEL-TEXT JOINT REPRESENTATION TO THAT OF LABEL SYNONYM-TEXT JOINT REPRESENTATIONS 908

IDENTIFY, WITH THE TRAINED ENCODER, ENTITIES IN A SPAN IN THE TEXT 910

FIG. 9

RECEIVE, WITH AT LEAST ONE PROCESSOR, A DIGITAL SPEECH SIGNAL 1002

CONVERT, WITH THE AT LEAST ONE PROCESSOR, THE DIGITAL SPEECH SIGNAL TO TEXT 1004

PERFORM SELF-ALIGNMENT PRE-TRAINING OF AN ENCODER ON ENTITIES AND THEIR SYNONYMS 1006

LABEL ATTENTION TRAIN THE PRETRAINED ENCODER BY ALIGNING LABEL-TEXT JOINT REPRESENTATION TO THAT OF LABEL SYNONYM-TEXT JOINT REPRESENTATIONS 1008

IDENTIFY, WITH THE TRAINED ENCODER, ENTITIES IN A SPAN IN THE TEXT 1010

IDENTIFY MEDICAL ENTITIES IN THE TEXT 1012

GENERATE, WITH AN EXPERT SYSTEM, CANDIDATE QUESTIONS BASED ON THE IDENTIFIED MEDICAL ENTITIES 1014

RERANK, WITH A MACHINE-LEARNED DEEP NEURAL NETWORK RERANKER, THE GENERATED CANDIDATE QUESTIONS BASED ON THE TEXT 1016

PRESENT A FIRST-RANKED QUESTIONS OF THE RERANKED QUESTIONS OR ALL OF THE RERANKED QUESTIONS TO A DEVICE 1018

FIG. 10

SPEECH SIGNAL PROCESSING USING ARTIFICIAL INTELLIGENCE

CROSS REFERENCE TO RELATED APPLICATIONS

This application claims priority to and incorporates by reference U.S. Patent Application Nos. 63/390,691 filed Jul. 20, 2022, 63/400,665 filed Aug. 24, 2022, and 63/417,950 filed Oct. 20, 2022.

TECHNICAL FIELD

This disclosure relates to data processing and more specifically, but not exclusively, speech signal processing using artificial intelligence.

BACKGROUND

Data processing can include processing of speech signal processing, linguistics, language translation, and audio compression/decompression. Further, this data processing can be performed by artificial intelligence. However, end-to-end trained machine learning models for speech processing require large amounts of training data to implicitly acquire domain knowledge and suffer from poor control over the model's output.

SUMMARY

In one aspect, a method of speech signal processing using artificial intelligence, includes receiving, with at least one processor, a digital speech signal; converting, with the at least one processor, the digital speech signal to text, performing self-alignment pre-training of an encoder on entities and their synonyms; label attention training the pretrained encoder by aligning label-text joint representation to that of label synonym-text joint representations; and identifying, with the trained encoder, entities in a span in the text.

BRIEF DESCRIPTION OF THE DRAWINGS

FIG. 1 illustrates a system according to an example embodiment.

FIG. 3(*b*) illustrates examples of training set construction.

FIG. 7 illustrates a global reranker according to an example embodiment.

FIG. 9 illustrates a routine in accordance with one embodiment.

FIG. 10 illustrates a routine in accordance with one embodiment.

DETAILED DESCRIPTION

Figure 2:
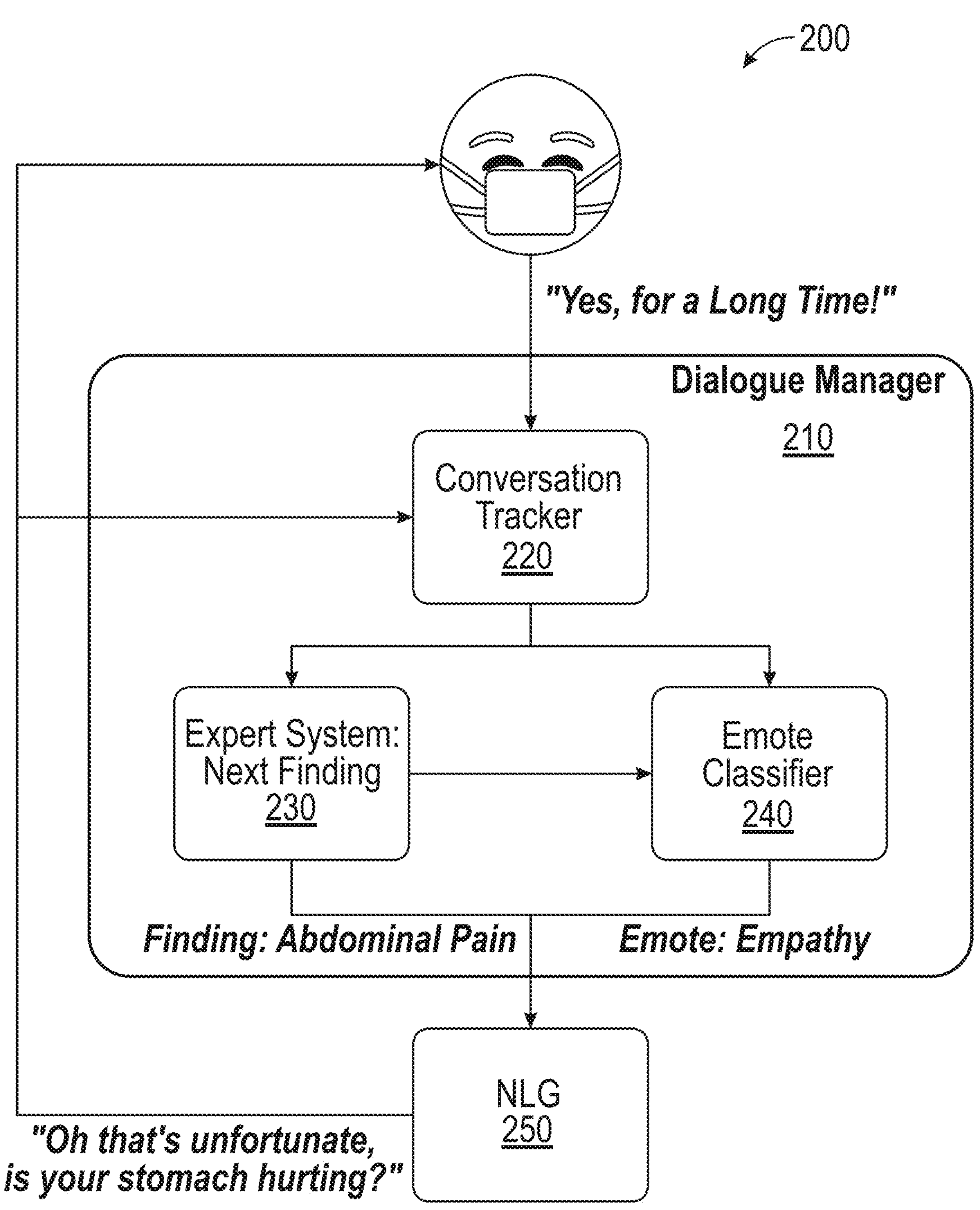
FIG. 2 illustrates a system for medical dialogue system for history taking according to an example embodiment.

FIG. 1 illustrates a system 100 according to an example embodiment. The system 100, which incorporates one or more machine learning models, includes a system 500 that maps free text to structured findings that can be used in system 200 or other systems that need structured data mapped to a knowledge base, such as SNOMED. The system 200 takes input, tracks conversation, gets next finding and emote variable to generate the next question to ask.

The system 100 may also include a system 700 that can re-rank questions to get a best question to ask by the system 200. The system 700 is trained on collected data, e.g., conversation dialog, list of questions suggested, and what question was chosen). Then, at inference time, potential questions are re-ranked accordingly.

System 200

A system 200 (MEDCOD, Medically-Accurate, Emotive, Diverse, and Controllable Dialog) integrates the advantage of a traditional modular approach to incorporate (medical) domain knowledge with modern deep learning techniques to generate flexible, human-like natural language expressions. First, the generated sentences are emotive and empathetic, similar to how a doctor would communicate to the patient. Second, the generated sentence structures and phrasings are varied and diverse while maintaining medical consistency with the desired medical concept (provided by the dialogue manager module of SYSTEM 200 described further below).

Example embodiments provide a hybrid modular and deep learning approach for a medical dialogue system targeted for history taking, which integrates domain knowledge and controllability from a modular design with human-like natural language generation (NLG) of a deep learning system. Medical dialogues between patients and doctors are one key source of information for diagnosis and decision making.

In the history-taking dialogue system, a dialogue manager uses both an expert system and a machine learned emotion classifier to control a deep-learning-based NLG module. The expert system uses a medical knowledge base (KB) that contains rich medical domain knowledge to identify which patient-reportable medical finding should be asked next. The emotion classifier then predicts the emotion with which the NLG module should ask the question. The NLG module is implemented using a deep learning approach to generate variable medical questions while maintaining medical consistency with the expert-system-derived finding, while containing emotion-classifier specified emotion.

Example embodiments add control codes to within the medical dialogue data for training a generative artificial intelligence (e.g., DialoGPT (dialogue generative pre-trained transformer)), which serves as the NLG model in the dialogue system. This use of control codes aims to maintain medical consistency in the generated questions while creating diversity that exhibits human-like attributes. Second, an emotion classifier is trained for use in the inference stage of NLG. This gives the system the ability to generate emotive sentences simulating human doctors' behavior. Finally, to overcome the problem of sparsity in the dialogue training data, a generative artificial intelligence, e.g., GPT-3, is used to augment finding-NL paired data jointly for both diversity and emotion while maintaining medical consistency in the natural language (NL) output.

A medical dialogue system for history taking combines expert-system-driven structured history taking (i.e. generate “Next Finding” using a medical KB) with deep-learning-driven emotion classification and controllable NLG. This integration allows the expert system to determine “what” to ask (by the system to the user) in an explainable and auditable way, and to use the deep-learning components to determine “how” to ask with human-like natural language. To enable this separation of “what” and “how” a NLG module in the dialogue system uses control codes provided by the expert system and the emotion understanding component to guide the formation of the NLG module’s output.

FIG. 2 provides overview of a medical dialogue system 200 comprising a dialogue manager 210 and a NLG 250. The dialogue manage 210 comprises three components:

1. Conversation tracker 220: this component tracks patient demographic information, reason for encounter, what findings have been reported by the patient, the text of the previous questions, and the text of patient responses.
2. Next Finding 230: this expert-system component takes patient demographics and patient findings and generates the target finding (next finding control code) to be asked next by the NLG.
3. Emotion Classifier 240: this model takes the conversation context and predicts the appropriate emote (emote control code) to be used by the NLG model 250. This component was trained using the Emote dataset (§ 4.3.1).

The NLG component 250 uses previous findings as well as control codes for the target finding and emote to generate a human-like NL question about the target finding. This component was trained using a Medical Conversations dataset.

Emotion Classifier 240

During medical history taking, the patient may provide sensitive or emotionally charged information (e.g. severe pain); it is imperative that an automated dialogue system reacts and emotes appropriately to this information, similarly to how a human doctor would (e.g. “Oh that’s unfortunate . . . ”). When analyzing patient-provider medical conversations, there was identified four broad classes of emote control codes that reflect emotional phrasing medical professionals use when talking with their patients. The control codes are Affirmative, Empathy, Apology, and None. The goal of the emotion classifier 340 is to predict the emote control code based on the conversational context. The conversational context contains three pieces of information: (1) previous question (2) patient response, and (3) target finding (which is the output of Next Finding module 230).

The model 240 embeds the contexts independently (using a pretrained model) to capture the semantics of the entirety of text, and then learning a linear layer of predictors, on reduced dimensionality, over the emote control codes. First, independently embed the three pieces of context using Sentence-BERT (SBERT) that takes as input a variable-size string (up to 128 tokens) and outputs a fixed-size vector containing semantically-meaningful feature values. Next, apply principal component analysis (PCA) to the embeddings of each input type independently and then concatenate the embeddings. Finally, train a logistic regression classifier 240 over the four emote control code classes. The model is trained on an Emote dataset.

Natural Language Generator 250

The NLG 250 has three goals:

1. Medical Consistency: Generated questions by the system must ask only about the target finding (e.g. if the target finding is “abdominal pain” then an acceptable question would be “Is your belly hurting?” while an unacceptable question would be “Do you have severe abdominal pain?”).
2. Phrasing Diversity: Generated questions must present phrasing variability, a major improvement over using templated questions (e.g. if the target finding is “abdominal pain”, instead of asking every time “Is your belly hurting?”, the model can generate alternative paraphrases such as “Do you have pain in your belly?”)
3. Emotional Awareness: Generated questions must be empathetic when appropriate. When gathering pertinent findings from the patient, the NLG 250 should output to emote appropriately based on the context: did the patient say anything particularly difficult that the NLG 250 should empathize with (e.g. a patient complaining about severe pain)? IS NLG 250 about to ask a highly relevant (for a presenting symptom) but sensitive question (e.g. checking with the patients if they have multiple sexual partners)?

The system 200 achieves these three goals simultaneously by fine-tuning a pretrained DialoGPT model. In the fine tuning process, the system 200 uses control codes for dialogue prompts to help guide the NLG 250 output at inference-time. Apart from the control codes, the system 200 also prompts with the previous findings, patient’s age and gender, as well as patient’s reason for visit. The full control codes comprise the next finding control code and the emote control code. At training time, the system 200 use a Medical Conversations dataset. At inference time, the control codes are generated by the dialogue manager 210: next finding control code comes from the Next Finding module 230 while the emote control code comes from the Emotion Classifier 240.

Datasets

The development of our medical dialogue system relies on a number of datasets. The process for constructing these datasets is presented in FIG. 3(*a*). Two preexisting datasets: KB 315 and Doctor Edits dataset 320. The KB 315 is used to generate two additional intermediate datasets, the Structured Clinical Cases dataset 340 and the Paraphrased Questions dataset 335. The Doctor Edits dataset 320 is used to construct the Emote dataset 345. Finally the Structured Clinical Cases 340, Paraphrased Questions 335, and Doctor Edits datasets 320 are combined to produce the Medical Conversations dataset 355. The final datasets comprise the Emote dataset 345 and Medical Conversations dataset 355.

Knowledge Base

The knowledge base (KB) 315 is an AI expert system similar to Quick Medical Reference (QMR) that is kept up-to-date by team of medical experts. In an example it contains 830 diseases, 2052 findings ($\mathcal{F}$) (covering symptoms, signs, and demographic variables), and their relationships. It also contains human generated patient-answerable questions for ascertaining the presence for every finding. Finding-disease pairs are encoded as evoking strength (ES) and term frequency (TF), with the former indicating the strength of association between the constituent finding-disease pair and the latter representing frequency of the finding in patients with the given disease. The inference algorithm of KB 315 computes differential diagnosis and also facilitates the next finding to ask using Next Finding module 230.

Doctor Edits Dataset 320

This is a small in-house dataset containing 3600 instances of doctor-edited questions in an example as well as doctor and patient dialogue turns preceding the doctor-edited questions. For training the emotion classifier 240, the system 200 performs a random 80/20 train/test split.

Structured Clinical Cases Dataset 340

Structured Clinical Cases dataset 340 contains simulated cases that consist of patient demographic data (age, sex), the chief complaint also known as reason for encounter (RFE) and a set of findings with "present" or "absent" assertion. The data is produced using an in-house simulator, Structured Clinical Case Simulator (SCCS) 325. SCCS 325 uses the KB 315 as a clinical decision support system. SCCS 325 starts with a finding and goes through the process of history taking to lead up to a diagnosis: It first samples demographic variables and a finding $f \in \mathcal{F}$ that serves as the chief complaint/RFE. Then, it computes the differential diagnosis (distribution over the diseases given the finding) using the underlying expert system and then samples findings taking into account the differential diagnosis. The newly sampled finding is asserted randomly to be present $f_{pos}$ or absent $f_{neg}$ with a slight bias to absent. If asserted as present, then the findings that are impossible to co-occur are removed from consideration (e.g. a person cannot have both productive and dry cough). The next iteration continues as before: computing differential diagnosis and then identifying next best finding to ask. The simulation for a case ends when a random number (5-20) of findings are sampled or the difference in score between the first and second ranked diagnosis is at least 20 (a desired minimum margin under expert system). Simulated samples with margin higher than that are added to the Structured Clinical Cases dataset 340.

Paraphrased Questions Dataset 335

The Paraphrased Questions dataset 335 contains findings and an associated set of questions, these questions being different ways (paraphrases) to ask about the finding (for examples see Table B.1). The goal of this dataset 335 is to imbue variability into the NLG model 250 with examples of different question phrasings.

Example embodiments use a generative artificial intelligence, e.g., GPT-3, to generate a large number of candidate questions for each finding. The system 200 curates a small but diverse set of thirty findings and manually paraphrase the expert-written question already available from the KB. Examples randomly sample 10 findings for priming GPT-3 to paraphrase new unseen findings. To restrain the generations but still acquire a diverse set of paraphrases, the output was limited to a single paraphrase at a time. GPT-3 (temp=0.65) was repeatedly invoked until the desired number of distinct paraphrases, each time priming GPT-3 with random sample of ten findings.

Minimal human effort required; only a single manually-written paraphrase is required for each finding in our small set, which is then used as guidance for GPT-3 to mimic the task on new findings. The candidate questions were manually validated using in-house medical professionals by asking them to label if the candidate question is medically consistent with the target finding, and keep only those that are. The system 200 achieved 78% correctness of finding-question pairs. Analyzing the failure cases, the error was either due to minor grammar issues or bad timing (i.e., "Are you sleepy?", which implies right now as opposed to intermittently throughout the day). Question paraphrases were collected for the 500 most frequent findings in the Structured Clinical Cases dataset.

Emote Dataset 345

The Emote dataset 345 contains a set of emote phrases, their corresponding emote control codes, and patient and medical professional dialogue turns that preceded the use of the emote phrase. This dataset is directly used to train the Emotion Classifier 240. The emote phrases are directly extracted from medical professional messages, while the emote control codes are manually assigned to each emote phrase.

The Doctors Edits dataset 320 was minded for medical professional messages that express emotion and identified three broad classes of emote control codes:

- Affirmative: A neutral confirmation of the user's response, flexible to be used in many conversation situations (e.g. thanks for the input).
- Empathy: A more emotionally charged response, implying something negative/painful about the conversation.
- Apology: This is an apology for asking a personal or sensitive question (e.g., "Sorry for asking a personal question, do you have multiple sexual partners?").

None was also included as an emotion code to reflect no emotion is added. Each emote code is associated a set of emote phrases that are frequently used by medical professionals to express these codes.

Medical Conversations Dataset 355

The Medical Conversations dataset 355 comprises dialogue context, next finding and emote control codes, and medical finding questions with emotional responses; the NLG model is trained on this dataset.

Figure 3A:
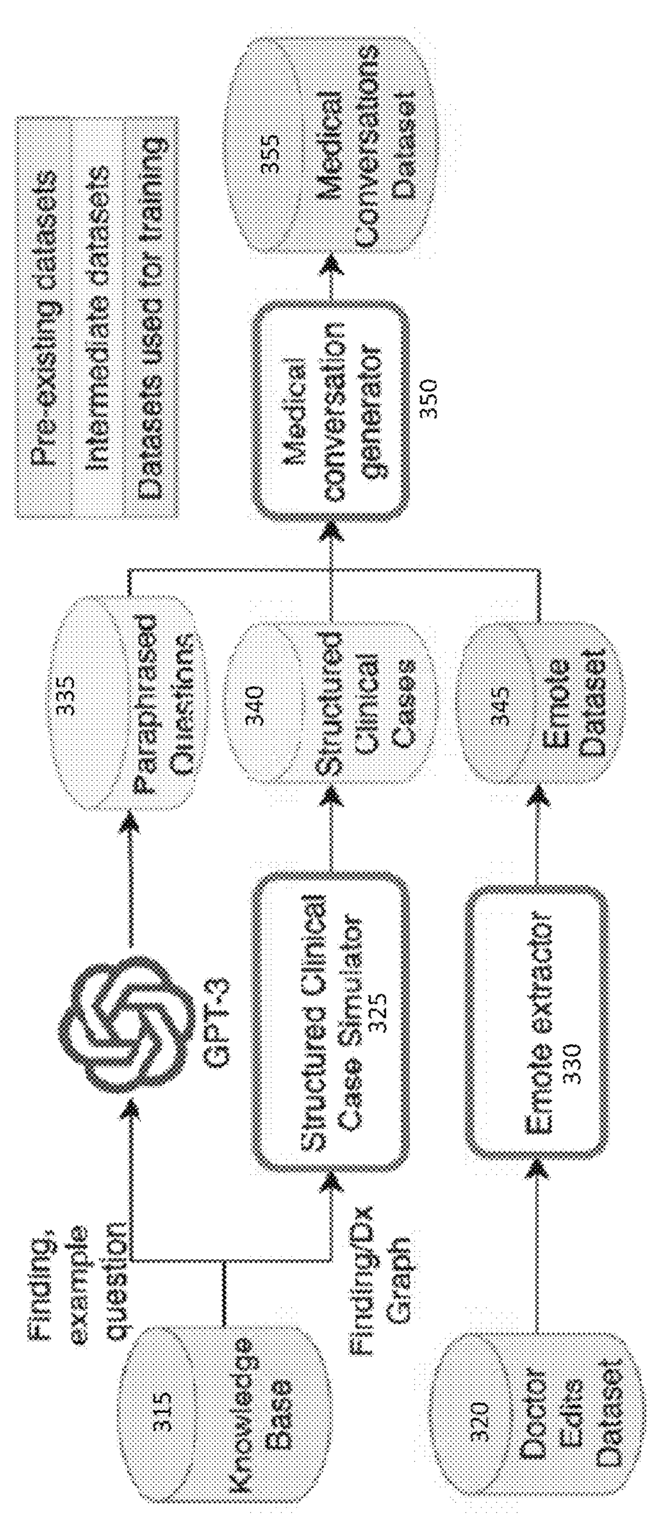
FIG. 3(*a*) illustrates a schematic of the dataset construction.
Figure 3B:
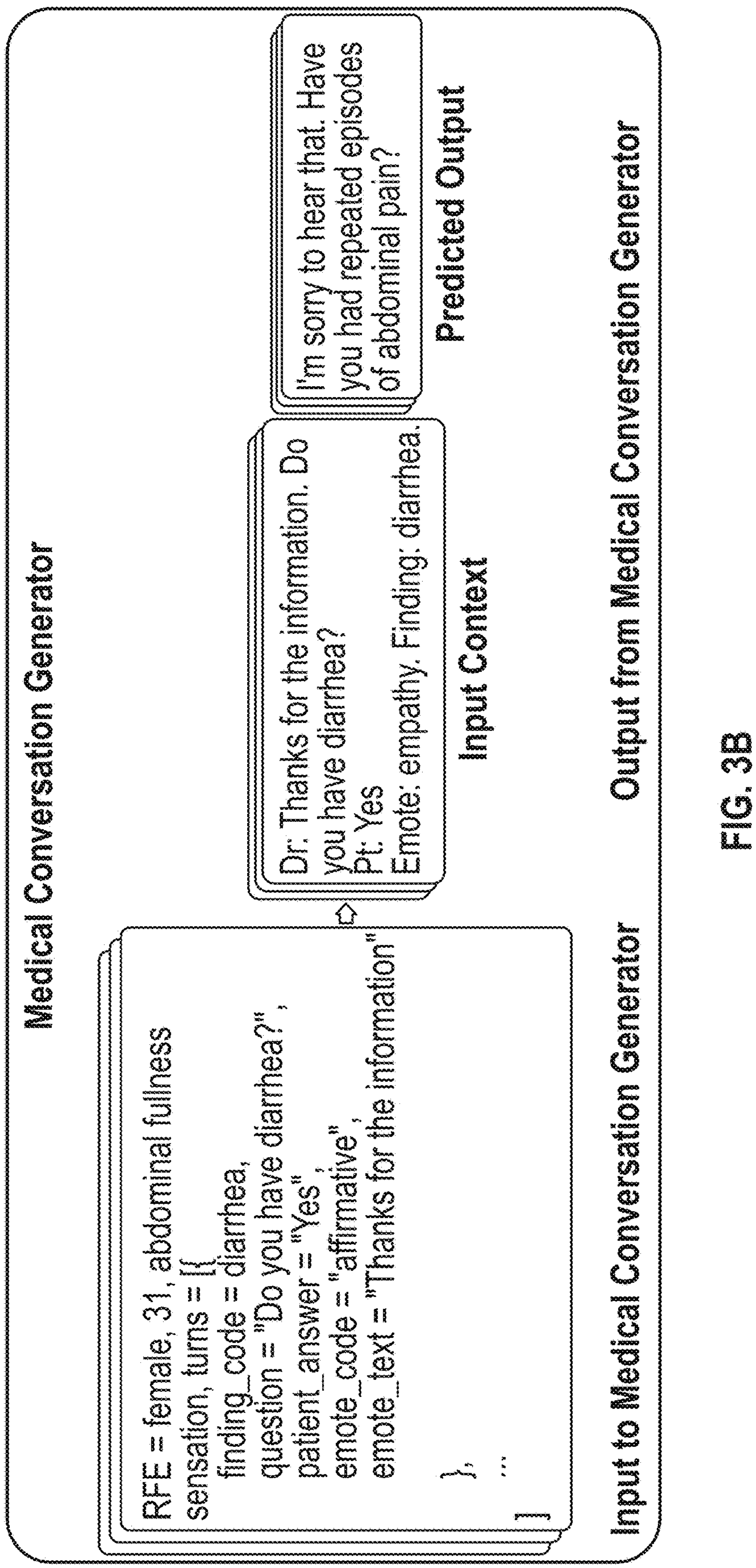

FIG. 3(*b*) provides a walk through for constructing Medical Conversation samples. To generate dialogue context sample from the Clinical Cases dataset 340 was sampled. From this RFE, patient demographic information, target finding, and the structured preceding finding and patient response was extracted. The preceding finding and the target finding are converted into a preceding medical professional question and target question in the following manner. A question corresponding to the finding was sampled from the Paraphrased Questions dataset 335. An emote control code and a random corresponding emote phrase from the Emote dataset was then randomly chosen. The emote phrase is then prepended to the finding-based-question. For the patient response "Yes" or "No" was selected based on the assertion attached.

Experimental Results

In this section we present both subjective and objective evaluation results which robustly demonstrate the improved output from an example embodiment when compared to counterparts that use the fixed-template approach to asking questions or can not emote.

Experimental Setup

Training Details

NLG: A pretrained DialoGPT-Medium from HuggingFace was our underlying NLG model. We train on 143,600 conversational instances, where each instance has only one previous conversation turn as context. We use a batch size of 16 with 16 gradient accumulation steps for an effective batch size of 64, for 3 epochs with a learning rate of 1e-4 and ADAM optimiser.

Emotion Classifier: We apply pretrained paraphrase-mpnet-base-v2 SBERT for embedding the conversational contexts. The Logistic Regression model is trained with C=10 and class re-weighting (to compensate for the data skew of the training data § 4.3.1). PCA is applied down to 70 components.

Ablations of System 200

We ablate system 200 by varying data/control codes supplied to each underlying NLG model during training, with all other parameters kept consistent. This allows us to understand the importance of variability, medical consistency and ability to emote. We use Expert to denote the variant of system 200 in which the NLG module 250 is trained only on expert questions (single question per finding). System 200-no-Emote's NLG module is trained on the Medical Conversations dataset with paraphrases but no emote codes while SYSTEM 200 is our feature-complete dialog system trained on the entire Medical Conversations dataset including emote.

TABLE 1

End2End Evaluation comparing between SYSTEM 200 (A) and Expert (B)

| | A | B | Equal |
|---|---|---|---|
| Total Pts | 63 | 30 | — |
| Mut. Excl. Pts | 49<br>(54.4%) | 16<br>(17.8%) | 25<br>(27.8%) |
| Aggregated with Majority Voting Applied | | | |
| Total Pts | 24 | 6 | — |
| Mut. Excl. Pts. | 20<br>(66.7%) | 2<br>(6.6%) | 8<br>(26.7%) |

End2End Evaluation: Main Results

This is our main evaluation that is targeted at understanding if the patient experience on the end-to-end system can be improved by providing them with a more natural conversational dialog. For this, we instantiate two identical medical dialog interfaces with different driving systems: Expert and SYSTEM 200. A set of 30 commonly occurring chief complaints along with demographic information such as age and gender were collected from a telehealth platform. We recruited five medical professionals for the labeling task such that each medical professional will go through the conversational flow for 18 chief complaints, giving three labels for each case.

Labeling instruction: While the focus is on patient experience, we engaged medical professionals because of the dual patient/doctor role-play for this evaluation. When they start on a chief complaint, they were to choose a relevant final diagnosis and answer questions to substantiate that final diagnosis; this ensures that the sequence of questions asked during conversation are clinically grounded. While doing so, they were also acting as a patient, answering and responding (e.g., by volunteering extra information) as someone presenting with the symptoms would. The medical professionals converse simultaneously with the Expert and SYSTEM 200 systems (the UI presents an anonymized A/B label) by providing identical answers for each conversation step between the two interfaces (but different answers between steps).

Once they perform 10 question responses or the conversation terminates (due to reaching a diagnosis), the encounter is over and they label each instance as follows: Enter a 1 for either Model A or Model B, based on how you think a new patient using the service for an ailment would feel. If you prefer the encounter with Model A, enter a 1 in the Model A column and 0 in the Model B column, and vice versa if you prefer Model B. To avoid spurious ratings when the two models are very similar, we also allowed the same grade to be given to both models if they were equally good/bad, but required a comment explaining the decision.

Results: Table 1 shows the evaluation results. When simply summing up the scores, system 200 achieves a score of 63 (max 90)—over twice as high as Expert. When separating scores into instances where one model is picked exclusively over the other or both are rated equally ("Mut. Excl. Pts"), we see a similarly strong result for our model; in over half the conversations enacted, system 200 is preferred holistically over Expert, while only 17.8% of the time is Expert preferred. When we inspect the difference, its often the case that SYSTEM 200 emoted with Affirmative when not emoting (None) would have been more appropriate.

We also considered majority voting for each of the patient complaints, which shows an even more exaggerated improvement by our model. Two-thirds of the time (66.7%), SYSTEM 200 is exclusively preferred over Expert, while only 6.6% of the time latter is preferred. In roughly one-fourth of the chief complaints, both models are rated equally.

In the majority of cases, SYSTEM 200 is preferred, indicating that within an automated dialog situation, the contributions discussed in this paper provide a marked improvement to patient experience.

NLG Module 250 Evaluation

The goal is to evaluate the system 200 and its ablations individually along three important aspects for medical dialog:

1. Medical Consistency: How well does the question capture the clinical implication of the target finding?
2. Fluency: How fluent/grammatically correct is the candidate question?
3. Empathy: How empathetic/emotionally appropriate is the candidate question, given the conversational context and the finding to ask next?

To collect the data for this evaluation, we begin with an in-house dataset of conversations from a tele-health platform. We decompose each conversation into three-turn instances, then attach an emote control code to each instance by performing prediction with the Emotion Classifier 240. To exaggerate the difference between instances, we only keep instances where the predicted class' probability>0.8. We then randomly sample 25 instances from each of the four predicted classes to create our final set of 100 evaluation instances. Finally, we generate a candidate question for the instances by passing the conversation context to each of the model variants for generation. A team of five medical professionals label each example along each of three axes on a scale of 1 to 5.

TABLE 2

NLG evaluation - SYSTEM 200 shows significant improvement in empathy and added variability without sacrificing other aspects

| Model Variant | Medical Accuracy | Fluency | Empathy |
|---|---|---|---|
| Expert | 4.956 | 4.942 | 2.772 |
| SYSTEM 200-no-Emote | 4.882* | 4.832* | 2.806 |
| SYSTEM 200 | 4.872* | 4.730* | 3.892* |

Results: Table 2 provides the comparative results. System 200 scored significantly higher in Empathy, showing that the Emote dataset additions improve human-evaluated empathy in a significant way. This result also indicates that the emote code is appropriately predicted by the Emotion Classifier 240.

There are many correct ways to query a finding, however the Expert model is trained on data with precisely one way, which is expert-annotated, so is likely to have optimal medical consistency (and also be the most fluent for the same reason). Because of this, we view Expert as close to best performance achievable along Medical Accuracy and Fluency. System 200 and System 200-no-Emote are still comparable to Expert indicating that the variations in how questions are framed do not significantly affect medical accuracy or fluency. As expected, given that its impossible to encode empathy preemptively (in the expert-annotated or paraphrased questions), Expert and SYSTEM 200-no-Emote score low on empathy. Note that it is not always necessary to emote, hence they receive non-zero score.

Emotion Classifier 240 Evaluation

Evaluating emotion is difficult as it is subjective and can be multi-label: in a situation, there may be multiple "correct" ways to emote so comparing predictions to a single ground-truth label (i.e., physician's emote) is unlikely to give an accurate notion of performance. We instead measure the emotional appropriateness using a small team of medical professionals.

Figure 4:
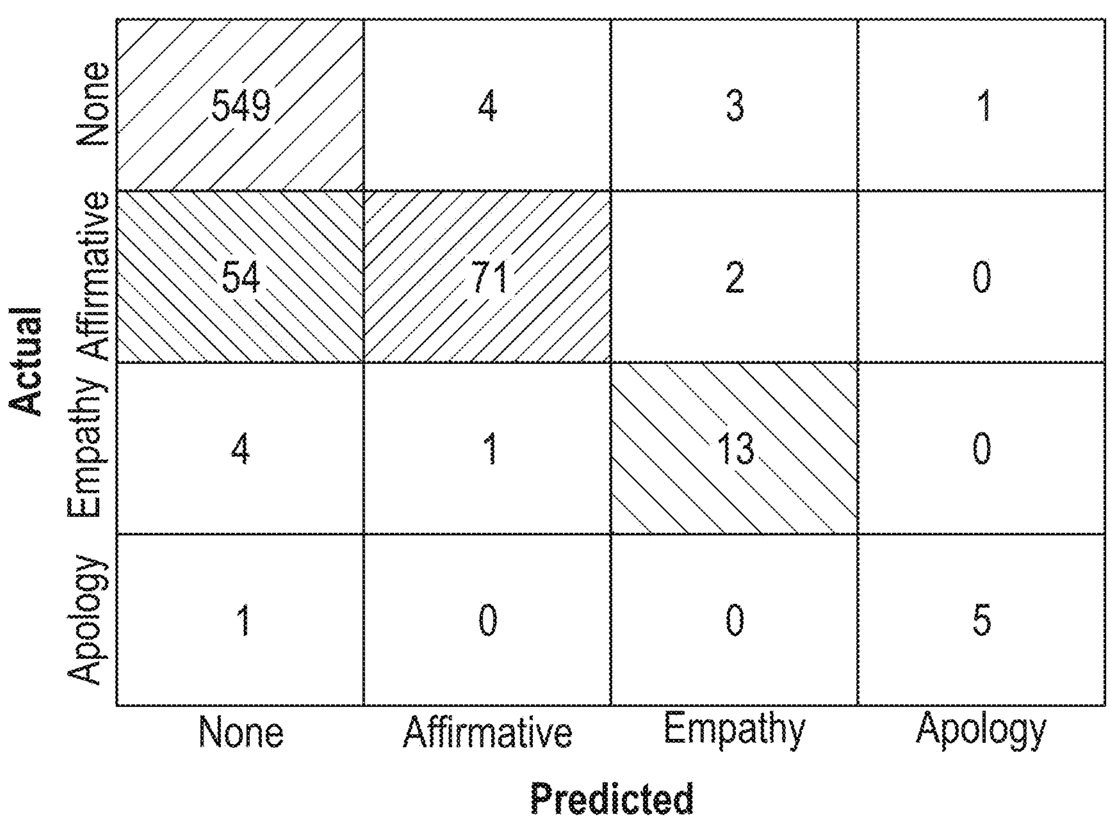
FIG. 4 illustrates emotion classifier evaluation.

For each instance in the Emote dataset test split, we pass the predicted emote control codes to a team of three medical professionals. They are tasked with labelling whether the emote code is appropriate, given the previous context in a conversation (input to our model). When the emote is not appropriate, an alternate emote is suggested by the labeller. We use majority voting on this data to obtain the final label, creating an alternate human-augmented test set. We evaluate the model's predictions against this human-augmented test set; FIG. 4 shows the confusion matrix on the full Emote dataset test split and Table D in Appendix shows the complete results.

On the human-augmented test set, our Emotion Classifier reached 0.9 accuracy with macro-F1: 0.8 and PR-AUC: 0.69. Looking at precision/recall statistics, each non-None emote class (and the model predictions overall) achieved precision>=recall, which is desired due to the high cost of inappropriate emoting; we want high confidence when we actually emote something, otherwise we should safely emote None. It should be noted that we did not tune the classification boundary but simply took the max-probability class as prediction; a high prediction threshold (e.g., 0.8) would further increase precision.

The confusion matrix (FIG. 4) illustrates a similarly strong picture of our Emotion Classifier's performance; the large majority of non-None predictions are correct. There are 54 'incorrect' None predictions by our Emotion Classifier, however, these are low- or zero-cost mispredictions, as it is always appropriate not to emote (the same cannot be said for Empathy, for example, where it can be very costly to empathize when not appropriate).

We also analyzed how conversational context affects predicted emotion. See Appendix E for complete attribution details. We find that empathy is strongly influenced by the previous patient response, apology by the next question and affirmative by all three parts of the input.

The system 200 uses a deep learning based NLG model incorporating in a medically consistent fashion, the knowledge of medical findings and an appropriate emotional tone when generating humanlike NL expressions through the use of their respective control codes, both provided by the dialog manager. The highly positive experimental results presented demonstrate the effectiveness of our approach.

APPENDIX A. SIMULATED CLINICAL CASE

TABLE A.1

A clinical case simulated from KB.

```
{
  "id": 0,
  "age": [
   "young adult (18 to 40 yrs)"
  ],
  "gender": [
    "male"
  ],
  "RFE":[ "abdominal fullness sensation+"]
  "findings": [
    "diarrhea, chronic+",
    "abdominal pain, recurrent attacks+".
    "lactose intolerance–",
    "gluten intolerance–",
    "marijuana use+",
    "relieved by hot shower+",
    "worse in the morning–",
    "vomiting, recurrent+",
    "intermittent+",
    "anxiety+",
    "sweating increase+",
    "thirst increase+",
    "weight loss+",
    "epigastric abdominal pain–",
    "chronic (> 4 weeks)+"
  ]
}
```

APPENDIX B. QUESTION PARAPHRASING USING GPT-3

| Finding | GPT-3 generated questions |
|---|---|
| anxiety | Are you anxious?<br>Do you have anxiety?<br>Have you been experiencing any anxiety?<br>Are you feeling nervous or anxious? |
| back pain | Do you feel pain in your back?<br>Is your back hurting?<br>Does your back hurt?<br>Are you experiencing pain in your back? |

TABLE B.1

Examples of question paraphrases generated by GPT-3.
Algorithm 1 Emotional Addition Extraction Input: Default question $Q_d$, Edited question $Q_e$
1: Initialize splits = split $Q_e$ on punctuation
2: Initialize scores = empty array
3: for s ∈ splits do
4: scores[s] FUZZYMATCHSCORE(s;$Q_d$)
5: end for
6: $i_q$ < argmax(scores)
7: return splits[: $i_q$] {Return everything preceding the (most likely) question}

APPENDIX C. DETAILS OF EMOTE DATASET CONSTRUCTION

We generated the emote dataset using an in-house Doctors Edits dataset, which contains 3600 instances of medical professional-edited questions and their preceding medical professional and patient messages. medical professional-edited questions are templated questions from KB and then were subsequently edited by the professionals based on the context of the conversation.

These edits are typically done to impart additional emotion to the text (emote phrase), although some of the edits are made for more pragmatic reasons (e.g. improve question readability). To extract the emote phrase, we use a simple heuristic method based on the assumption that the edited question is of the form: [emote phrase] KB question [additional information], e.g. "Oh I'm sorry to hear that. Do you have ushing? That is, do your arms feel warmer than usual?. We simply split the edited question on punctuation and identify which part of the split question is closest to the KB question by fuzzy string matching (https://github.com/seatgeek/fuzzywuzzy); once the most similar question section is identified, the emote phrase is returned as the preceding sub-string to this section. (Algorithm 1 in Appendix for details). The accuracy of this simple algorithm for our task was evaluated manually and shown to achieve 99.4% accuracy within our limited domain of conversation. Table C.1 presents example emote language phrases corresponding to the emote control codes.

The dataset has a class imbalance towards None, indicating it is often not necessary to emote, and when one is emoting, Affirmative is the most common.

TABLE C.1

Examples of emote codes and example sentences that are mined from real world medical conversations. See text for details

| Control code | Emote language |
|---|---|
| affirmative | Thanks for the input |
| | Okay |
| | I see |
| | Got it |
| empathy | Sorry about that |
| | That's concerning |
| | Okay, I'm sorry to hear |
| apology | I am sorry for asking |
| | I apologise if this is personal |
| | I am sorry for asking if it sounds personal but may I know |

APPENDIX D. EMOTION CLASSIFIER PERFORMANCE

TABLE D.1

Classification scores for Emotion Classifier on human-augmented Emote dataset.

| | Precision | Recall | F1 | Support |
|---|---|---|---|---|
| None | 0.90 | 0.99 | 0.94 | 557 |
| Affirmative | 0.93 | 0.56 | 0.70 | 127 |
| Empathy | 0.72 | 0.72 | 0.72 | 18 |
| Apology | 0.83 | 0.83 | 0.83 | 6 |
| Accuracy | — | — | 0.90 | 708 |
| Macro Avg | 0.85 | 0.78 | 0.80 | 708 |
| Weighted Avg | 0.90 | 0.90 | 0.89 | 708 |

APPENDIX E. DISSECTING EMOTION CLASSIFIER: EMOTION ATTRIBUTION

As we mentioned in § 3.1, we used logistic regression as the final classifier for the emote classifier, where:

$$logits(p_i) = \sum_j M_{ij}^T x_j + b_i,$$

where $p_i$ is the probability of the $i^{th}$ control code and index j represents the input source (previous question, previous patient response, target finding), $M_{ij}$ is the learned coefficient vector corresponding to $i^{th}$ class and $j^{th}$ source, $x_j$ is SBERT embedding vector corresponding to $j^{th}$ input source, after dimensionality reduced by PCA, and b are learned biases.

We analyzed how conversational context affects predicted emotion. Using eq. 1, we compute the contribution of each input source j for each output control code i by looking at the individual summands $$M_{ij}^T x_j.$$

The biases for each of the four classes are the following: None=3.27, A_rmative=0.88, Empathy=−1.66, Apology=−2.49.

TABLE E.1

Contribution of input source to emote classification.

| | Previous Question | Previous Response | Next Question |
|---|---|---|---|
| Affirmative | 0.8 | 0.41 | 0.44 |
| Apology | 0.89 | 0.95 | 3.1 |
| Empathy | 0.75 | 2.1 | 0.76 |
| None | 0.071 | 0.18 | 0.19 |

Table E.1 shows the mean contribution of each input source to the predicted output control code (i*=arg maxi p). We find that the apology and empathy are strongly predetermined by a single input source. For the apology class main contributor is the next question, this is consistent with expectation (i.e we apologize for asking personal and embarrassing questions). For the empathy class the main contributor is the previous response, which again matches intuition that we show empathy if the patient response involves significant negative sentiment. For affirmative class, all three types of inputs are taken into account, with previous question has the largest contribution. Intuitively, this makes sense that we may prioritize responding to the previous answer based on not only what the exchange has been so far, but also what we are going to ask next. For the none class, none of the input sources contribute significantly, this is consistent with the none class being driven by the bias (3.27!)—when the model doesn't predict an emote it is because none of the input sources contributed to an alternative class.

APPENDIX F. GENERALIZATION OF MEDCOD'S NLG COMPONENT

One of the key benefits provided by a neural language generator like DialoGPT over a simple lookup-based system is its ability to generalize to new unseen findings; the broad world knowledge learned through pretraining gives the model an ability to generate appropriate questions for new findings. Fig. F provides qualitative results on our NLG model for various 'types' of input findings.

TABLE F.1

Examples of MEDCOD generating presence questions for unseen findings (temperature = 0.6 unless specified). The model is able to generate a question medically consistent with the input finding, despite never seeing it during training, showing the NLG model's ability to generalize. When generating for a finding which it can't get semantic information from (e.g., a fake disease name), it defaults back to generic "Do you have [disease]" style questions, unless we use a higher temperature in which case we get unexpected results. The model can also generate questions for non-medical findings (e.g., lost my phone); in these cases it again can generate a semantically consistent question with the "finding", although generations lose accuracy when temperature is raised.

| Category | Finding | Generation |
| --- | --- | --- |
| Unseen semantically meaningful findings | knuckle pain<br>spider bite<br>fell off motorbike<br>broken arm | Do you have any pain in your knuckles?<br>Have you been bitten by a spider recently?<br>Have you recently fallen off a motorbike?<br>Is your arm broken? |
| Unseen fake finding | dysparatosis<br>dysparatosis (temp = 0.9) | Do you suffer from dysparatosis<br>Have you been diagnosed with dysparatosis?<br>Do you have difficulty having a bowel movement? |
| Misc. findings showcasing general world & grammar knowledge | eaten too much cheese<br>lost my phone<br>slept through my alarm<br>slept through my alarm (temp = 0.9) | Have you recently eaten too much cheese?<br>Have you lost your phone?<br>Did you miss your alarm?<br>Have you been having trouble sleeping? |

APPENDIX G. QUALITATIVE COMPARISON OF GENERATED QUESTIONS BY THREE MEDCOD INSTANTIATIONS

TABLE G.1

Qualitative comparison of generated questions by the three NLG models. Note the lack of diversity in the Expert model and lack of emotion in the MEDCOD-no-Emote model. The questions generated by MEDCOD show the greatest combination of emotion and variation. For brevity, not shown is the previous turn of the conversation that is also used as input.

| Model | Finding | Emote | Generated Responses (multiple invocations) |
| --- | --- | --- | --- |
| Expert | recurrent headache<br>generalized weakness | affirmative<br>empathy | Do you have headaches that come and go often?<br>Do you have headaches that come and go often?<br>Does your entire body feel weak?<br>Does your entire body feel weak? |
| MEDCOD-no-Emote | recurrent headache<br>generalized weakness | affirmative<br>empathy | Do you have headaches that occur on a regular basis?<br>Are your headaches recurring?<br>Are you feeling weak in your entire body?<br>Is your entire body weak? |
| MEDCOD | recurrent headache | affirmative | Thanks for the input. Does your headache keep coming back?<br>Okay. Is your headache recurrent? |
| | generalized weakness | empathy | Sorry to know that. Are you weak all over?<br>That's worrisome. Do you experience weakness all over your body? |

APPENDIX H. FULL CONVERSATION COMPARISON

| Complaint: headache | |
| --- | --- |
| MEDCOD | Expert |
| Curai<br>Are you experiencing a severe headache? | Curai<br>Do you have a severe headache? |
| Patient<br>Yes, and it's very very painfull | Patient<br>Yes, and it's very very painfull |
| Curai<br>I am sorry to hear that. Is your headache mostly concentrated around your forehead? | Curai<br>Do you have a headache that is concentrated mostly around your forehead? |
| Patient<br>Yes it is | Patient<br>Yes it is |
| Curai<br>I hear you. Do you suffer from headaches that come and go? | Curai<br>Do you have haedaches that come and go often? |
| Patient<br>No, not usually | Patient<br>No, not usually |
| Curai<br>Is your headache mainly located in your temple area on the side of your head behind your eyes? | Curai<br>Is your headache mainly in your temple area (side of head behind eyes)? |
| Patient<br>Yes most of the time | Patient<br>Yes most of the time |
| Curai<br>Okay, I'm sorry to hear. Does your headache only occur on one side of your head? | Curai<br>Do you have a headache that is only on one side of your head? |
| Patient<br>No it's on both sides | Patient<br>No it's on both sides |
| | Curai |

-continued

| Complaint: headache | |
|---|---|
| MEDCOD | Expert |
| Curai<br>Does your headache pulsate or throb?<br>Patient<br>Yes, often<br>Curai Current Question<br>Does light seem to hurt your eyes? | Would you describe your headache as throbbing?<br>Patient<br>Yes, often<br>Curai Current Question<br>Does light hurt your eyes? |

APPENDIX I. GPT-3 INVOCATIONS

Following are some prompts given to GPT-3 to generate new paraphrases for the progressive paralysis finding. Bold is the generated response by GPT-3. These are used to generate the following five distinct paraphrases:

Are you noticing a progressive weakness on one side of your body?

Have you noticed a gradual weakening of one side of your body?

Have you noticed a weakness on one side of your body that seems to be getting worse?

Has your weakness on one side of your body been getting progressively worse?

Is one side of your body becoming increasingly weaker than the other?

Rephrase the question asking if the patient has the given symptom

Symptom: epigastric pain [PRESENT]. Question: Do you have pain in your upper middle abdomen, just below your breast bone?=>Do you have pain just beneath your breast bone in the middle of your upper abdomen?

Symptom: anosmia [PRESENT]. Question: Are you experiencing a decreased sense of smell?>Is your sense of smell impaired?

Symptom: crushing chest pain [PRESENT]. Question: Do have chest pain that feels like someone is crushing your chest?=>Are you experiencing a crushing sensation around your chest with your chest pain Symptom: parkinsonism [PRESENT]. Question: Have you ever been diagnosed with parkinsonism?====>Do you have a history of parkinsonism?

Symptom: lower extremity pain [PRESENT]. Question: Does your leg hurt?=>Are you experiencing pain in your leg?

Symptom: nocturia [PRESENT]. Question: Do you have to urinate frequently even at night, waking up two or more times to urinate?=>During the night, do you wake up several times to urinate?

Symptom: chronic productive cough [PRESENT]. Question: Have you had a cough lasting for more than 8 weeks that is wet or brings up phelgm?=>Has your cough been wet or bringing up phlegm for more than eight weeks?

Symptom: exertional chest pain [PRESENT]: Question: Do you experience chest pain that is worse with exertion, such as when walking or doing other physical activity?=>Do you notice your chest pain gets worth with physical activity such as running?

Symptom: substernal chest pain [PRESENT]. Question: Do you have any pain in the center of your chest behind your sternum [breastbone]? Is there any pain behind the sternum [breastbone] in the center of your chest?

Symptom: atherosclerosis [PRESENT]. Question: Have you been diagnosed with atherosclerosis?=>Do you suffer from atherosclerosis?

Symptom: progressive paralysis [PRESENT]. Question: Have you noticed increasing weakness on one side of your body?=>Are you noticing a progressive weakness on one side of your body?

(a) First Invocation

Rephrase the question asking if the patient has the given symptom

Symptom: nocturia [PRESENT]. Question: Do you have to urinate frequently even at night, waking up two or more times to urinate?=>During the night, do you wake up several times to urinate?

Symptom: hemiplegia [PRESENT]. Question: Do you have any weakness on one side of your body?=>Does one side of your body seem to be weaker than the other?

Symptom: pain relieved with food [PRESENT]. Question: Do you have pain that is relieved by food?=>Does eating food ease the pain?

Symptom: anosmia [PRESENT]. Question: Are you experiencing a decreased sense of smell?=>Is your sense of smell impaired?

Symptom: recurrent abdominal pain [PRESENT]. Question: Have you had the repeated episodes of your abdominal pain over the last 3 months?=>Has your abdominal pain occurred multiple times over the last 3 months?

Symptom: altered mental status [PRESENT]. Question: Do you have any impaired consciousness?=>Do you feel that your mental state is impaired?

Symptom: parkinsonism [PRESENT]. Question: Have you ever been diagnosed with parkinsonism? Do you have a history of parkinsonism?

Symptom: allergen exposure [PRESENT]. Question: Have you been around anything you are allergic to?=>Have you recently come into contact with anything you are allergic to?

Symptom: muscle weakness [PRESENT]. Question: Do you feel like your muscles are abnormally weak? Are you experiencing abnormally weak muscles?

Symptom: aphasia [PRESENT]. Question: Do you have difficulty speaking or understanding language?=>Are you finding it hard to speak or understand language?

Symptom: progressive paralysis [PRESENT]. Question: Have you noticed increasing weakness on one side of your body?=>Have you noticed a gradual weakening of one side of your body?

(b) Second Invocation

System 500: Open Set Label Attention Transformer for Medical Entity Span Extraction (OSLAT)

Identifying spans in medical texts that correspond to medical entities is one of the core steps for many healthcare NLP tasks such as ICD coding, medical finding extraction, medical note contextualization, to name a few. A new transformer-based architecture called OSLAT, Open Set Label Attention Transformer, uses a label-attention mechanism to implicitly learn spans associated with entities of interest. These entities can be provided as free text, including entities not seen during OSLAT's training, and the model can extract spans even when they are disjoint.

System 500 enables span tagging that allows an open set of entities and is robust to disjoint spans for individual entities. We assume that we are given the entities found in the target text, and use that information to implicitly identify which spans correspond to the provided entities. These "entity presence annotations" can be made with free text, new entities can be added as needed, and entity labels do not need to have any lexical overlap with tokens in the target text. To implicitly learn span information, system 500 (also referred to as Open Set Label Attention Transformer (OSLAT)) removes the typical label-attention transformer requirement of being trained on a fixed universe of labels. First, we use a transformer-based encoder to not only encode the sentence, but also the labels. Second, we use a novel Label Synonym Supervised Normalized Temperature-Scaled Cross-Entropy (LSS-NT-Xent) loss, an extension of NT-Xent, instead of the classification objectives typical to label-attention models.

We test the generalizability of our approach by training on one of two different datasets: a proprietary patient-generated text dataset of "Reasons for Encounter" (RFE) for primary care visits and a dataset with physician-generated text derived from Elhadad et al. (2015) (hNLP). We then test each of the two models on both datasets. Despite significant vocabulary differences between the two datasets, we show that system 500 beats rule-based and fuzzy-string-matching baselines even when applied on a dataset the model was not trained on and with entities not previously seen.

We present examples from a patient-facing dataset we use in this disclosure in Table 3. The table shows the spans identified by our model. While the "knee swelling" (row 1) is a contiguous span and can be extracted using a lookup match, it is almost impossible for any method that uses exact string matching to pickup the disjoint spans for the entities "knee pain" (row 2) or "cervical lymphadenopathy" (row 3), even if all synonyms of the entities are available at their disposal. Identifying "dyspnea" span (row 4) would be very challenging even with CHV. Entity identification methods that assume a fixed entity vocabulary, and especially those that rely on string matching, will always struggle in practical settings.

TABLE 3

For each entity in first column, the second column provides an example text that contains in the entity. We can see that the entity can present as a contiguous-span of text (row 1) or over disjoint-spans (rows 2-3). Also, for the same text, two different entities may share a span (rows 1 and 2). For each (text, entity), we also highlight the text according to the prediction from the proposed model: Brighter the green (best viewed in color), the more confident that the model is that the underlying text is part of describing the entity.

| Entity | Text containing the entity |
|---|---|
| knee swelling | pain and swelling in knee |
| knee pain | pain and swelling in knee |
| cervical lymphadenopathy | swollen lymph node on right side of neck |
| dyspnea | been having weird head pressure and anxiety for the past couple weeks also, having to take really deep breaths to catch my breath. |

Example embodiments provide a new machine learning model for identifying spans in a medical text where a particular entity is mentioned. The model has three principal advantages when compared to existing approaches: First, it is not limited to a fixed set of entities used during training. This means that the model is useful in practical settings where new labels may emerge (e.g., 'COVID') or when recognizing an entity that is not in the training set (e.g. 'sudden and severe abdominal pain'). Second, the model can identify spans, including disjoint ones, even across different sentences. Often, weak supervision methods use approximate string matching to bootstrap contiguous spans for downstream tasks. Given the model's competitive performance over these lookup methods, it can serve as an approach to rapidly generate data needed for downstream medical NLP tasks. Third, the model is robust to changes in vocabulary (colloquial patient language or medical expert jargon).

Example embodiments use a label-attention paradigm to implicitly learn spans corresponding to target entities by observing the label-attention values. To achieve this, the system 500 (aka Open Set Label Attention Transformer (OSLAT)) modifies the typical label-attention transformer architecture to use the encoder not only to embed the target text, but also the label. Prior to training on the label-attention, we perform a self-alignment pre-training of the encoder. After pre-training, we perform the label-attention training of the system 500 using a novel loss, Label Synonym Supervised Normalized Temperature-Scaled Cross-Entropy (LSS-NT-Xent). This loss leverages knowledge about the labels derived from UMLS or other vocabularies, enabling supervised contrastive training while maintaining an open set of possible labels.

Figure 5:
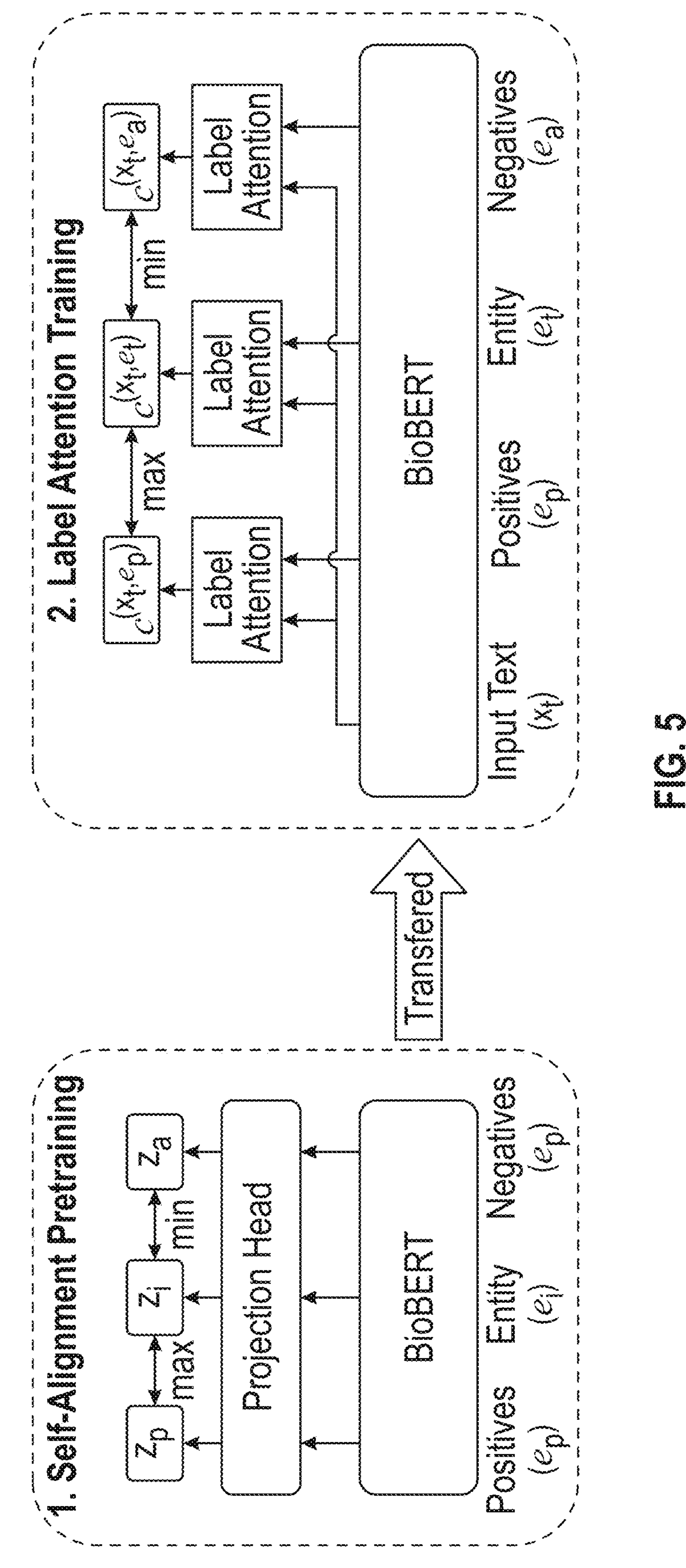
FIG. 5 illustrates an example two-stage training approach according to an example embodiment.

An overview of the two-stage approach is illustrated in FIG. 5. In the first step, we perform self-alignment pretraining on medical entities and their synonyms. This decreases the anisotropy in encoded entity representations. In the second step, we use the pretrained encoder to align label-text joint representations to that of label synonym-text joint representations. The representations themselves are obtained through label attention. Because in this process, the entity representations are obtained from an encoder, we can handle previously unseen entities (from an open set of entities).

There exists a universe of all entities, denoted by $\varepsilon$. Note, we do not need to explicitly define $\varepsilon$. During training, we will observe a subset of these entities $\varepsilon_{seen}$ and the remaining unobserved (open-set) is $\varepsilon_{unseen}=\varepsilon\backslash\varepsilon_{seen}$. We then assume access to a dataset $$\mathcal{D}_{train} = \{(x_t, e_t)\}_{t=1}^{T},$$

where $x_t$, is the $t^{th}$ target text and $e_t$ is an entity present in it, with $$\varepsilon_{seen} = Ue_{t_{t=1}}^{T}.$$

For each entity, $e_t \in \varepsilon_{seen}$, we also assume access to its synonyms, obtained from an external source such as UMLS (which we use in this paper). During inference, we are provided with input text-entity pair (x, e) s.t. $e \in \varepsilon$, this reflects the application of the model in the wild. The goal of this is to identify the spans of text in x that describes e.

Self-Alignment Pretraining on Medical Entities

For system 500 results presented in this paper we start with the BioBERT encoder. In order to decrease representational anisotropy of entity embeddings, we perform a self-alignment pretraining. For the change in anisotropy see FIG. 6, which shows a density plot of cosine similarities between 1000 positive (synonymous) and negative (nonsynonymous) entity pairs randomly sampled from $\varepsilon_{seen}$ (RFE). Before pretraining the encoder could not differentiate representations of entity synonyms from non-synonyms, after the pretraining there is a dramatic shift fully separating synonyms from non-synonyms In particular, for medical entity $e_i \in \varepsilon_{seen}$, we obtain its representation $h^{(e_i)}$ by taking the [CLS] token embedding of the last hidden layer of BioBERT. To apply the contrastive loss function, we follow the model architecture described in SimCLR, where a two-level feed-forward projection head maps the representation $h^{(e_i)}$ from BioBERT into a low-dimension space, before a supervised contrastive loss, NT-Xent, is applied to the normalized projection output $z_i$ (Khosla et al., 2020; Gao et al., 2021):

$$\mathcal{L}_{pre} = \sum_{i \in B} \frac{-1}{|P(i)|} \sum_{p \in P(i)} \log \frac{\exp(z_i \cdot z_p / \tau)}{\sum_{a \cdot \varepsilon_{seen}} \exp(z_i \cdot z_a / \tau)} \quad (1)$$

For each entity in batch B, the positives $z_p$ are projected representations from the synonym set P(i) of entity $e_i$, with |P(i)| as its cardinality, while the negatives $z_a$ are projected representations from sampled entities from $\varepsilon_{seen}$. Finally, hyperparameter $\tau$ denotes the scalar temperature. As the entities are organized into disjoint synonym sets, we apply a stratified sampling strategy for sampling negatives, where we first sample a synonym set and then sample an entity from that set. This ensures that entities with a smaller synonym set do not get under-represented during training. After the self-alignment pretraining, we discard the projection head keeping the fine-tuned encoder. Details on our training procedure can be found below.

Label Attention Training

System 500 supports an open set of labels by jointly encoding labels and target texts into the same subspace. To obtain the representation of the entity spans within the target text, we first encode label $e_t$ and target text $x_t$ with our self-alignment pretrained BioBERT. Specifically, for $(x_t, e_t) \in \mathcal{D}$, the label representation $h^{(e_t)} \in \mathbb{R}^{1 \times d}$ and target text representation $h^{(x_t)} \in \mathbb{R}^{n \times d}$ from the last hidden layer of BioBERT (with hidden size d) are used to compute the label-attention score using a variant of the dot-product attention:

$$\alpha^{(x_t,e_t)} = \text{Softmax}(h^{(e_t)}(h^{(x_t)})^T) \quad (2)$$

where the attention score $$\alpha_k^{(x_t,e_t)}$$

can be interpreted as the token-wise semantic similarity between the label $e_t$ and the kth token of target text $x_t$. Since the [CLS] token for the target text can contain aggregate semantic information about the entire input, we found that the model often resorted to attending solely to the [CLS] token. To mitigate this issue, we remove the [CLS] token from $h^{(x_t)}$ to encourage the model to attend to other portions of the target text. Finally, we compute the entity span representation as a weighted sum of the target text $h^{(x_t)}$ by the attention scores:

$$c^{(x_t,e_t)} = \sum_{k=1}^{n} \alpha_k^{(x_t,e_t)} h_k^{(x_t)} \quad (3)$$

To train the model using a variant of NT-Xent which we call Label Synonym Supervised Normalized Temperature-Scaled Cross Entropy (LSS-NT-$X_{ent}$):

$$\mathcal{L}_{LSS}(I) = \sum_{i \in B} \frac{-1}{|P(t)|} \sum_{p \in P(t)} \log \frac{\exp(c^{(x_t,e_t)} \cdot c^{(x_t,e_p)} / \tau)}{\sum_{a \cdot \varepsilon_{seen}} \exp(c^{(x_t,e_t)} \cdot c^{(x_t,e_p)} / \tau)} \quad (4)$$

Similarly to the self-alignment pre-training described in § 3.1, we use $e_t$'s synonym set P(t) as positives and randomly sample negatives from the $\varepsilon_{seen}$ and their synonyms.

At inference time, we use the attention scores $\alpha^{(x_t,e_t)}$ to predict whether each token of $x_t$ lies in the span of entity $e_t$.

Datasets

There are two complementary datasets. The first dataset is comprised of texts in which patients describe their health issues (RFE dataset). The second dataset is comprised of discharge summary notes written by physicians (hNLP dataset). The train-test split procedure of these datasets is itself non-trivial as we need to split both target texts and medical entities such that the test set contains both seen and unseen entities. Finally, we compare the entities in the two datasets.

Train/Test Dataset Construction

We start with an intermediate dataset of the form $(x_k, E_k)$ where $x_k$ is the $k^{th}$ input text that has a set $E_k$ of entities to reflect that multiple entities can be in the same input text. Then, $\varepsilon = \cup_K E_K$ is universe of entities, and p(e) is marginal probability of entity e in the dataset.

Constructing $\varepsilon_{seen}$, $\varepsilon_{unseen}$: For our experiments, we choose 10% of the entities as unseen. We choose these entities randomly from 20%, 40%, and 40% from high, medium, and low marginal probability bins of p(e) so that we capture entities across the spectrum of frequency distribution.

Train-Test split: We split the dataset into disjoint sets for training and testing from the perspective of the entity. For each entity $e \in \varepsilon_{unseen}$, we associate all pairs $((x_k, e)_{k:e \in E_k})$ to the test set. For each entity $e \in \varepsilon_{seen}$, we randomly sample, without replacement, 10% of $((x_k, e)_{k:e \in E_k})$ pairs for the test set and remaining 90% to training set. We ensure that all entities in E seen have at least five examples in the training set. If not, we first prioritize adding to the training set.

Span level labels for test set: We also augment the test set with the spans that correspond to the concept. In particular, an example in test set is of the form $(x, e, \{s_{i,e}\})$ where $\{s_{i,e}\}$ is the set of spans that collectively identify the entity e in the text x. In particular, each element in $\{s_{i,e}\}$ encodes the character level beginning and end of the phrase in x that is constituent of e.

Thus, $$\mathcal{D}_{train} = \{(x_t, e_t)\}_{t=1}^{T}$$

where $e \in \varepsilon_{seen}$ and $$\mathcal{D}_{test} = \{(x_k, e, \{s_{i,e}\})\}_{k=1}^{K},$$

where $e \in \varepsilon$.

Dataset 1: Reason for Encounter (RFE) Dataset

This is a dataset gathered from a telemedicine practice. It contains a labeled subset of 4909 encounters with 4080 patients. The distribution of biological sexes in the dataset is 75% female and 25% male, the distribution of ages is 74% below 30 years old, 20% between 30 and 50 years old, and 6% above 50 years old. This distribution is not a random sample representative of the overall practice's population, but rather comes from a mixture of random samples drawn from two distinct times, and also from an active learning experiment for a different project Patients starting a visit describe their reason for seeking an encounter. The language used in RFEs is more colloquial and less standardized, featuring many disjoint spans for medical entities. We can see some examples in Table 4. Each RFE is labeled by medical experts with corresponding medical findings using UMLS ontology. The RFEs have an average length of 26 words.

We constructed the train-test dataset as outlined in § 4.1. In particular, $|\varepsilon_{seen}|=450$ and $|\varepsilon_{unseen}|=73$. This results in roughly 90% of the RFEs to have at least one entity that is seen. 24% of RFEs have at least one entity in unseen and 10% of RFEs have all their entities in $\varepsilon_{unseen}$. For more statistics, see Table 4.

For the test set, we also obtained span-level labels from the same pool of medical experts. They were independently shown (RFE, entity) pairs and asked to highlight all the spans of text from which they can deduce the entity. By labeling each pair independently, we also get sub-spans that are shared across multiple concepts. As an example, "pain and swelling on my wrist" has two entities—wrist swelling and wrist pain—and share the same sub-span "wrist" (in this example "wrist pain" is a disjoint span).

Dataset 2: hNLP Dataset

Our second dataset is derived from the training data from the SemEval-2015 Task 14. In particular, we start with the provided 136 discharge notes and their corresponding medical concepts along with their location spans. We split each discharge note into smaller text chunks using the newline delimiter. We removed chunks that do not have any entities associated with them. This leads to 5508 text chunks with an average length of 69.08 words. We built an initial dataset with text chunks, their entities, and their spans. These entities are UMLS Concept Unique Identifiers (CUIs).

We then constructed the train-test dataset as outlined in § 4.1. $|\varepsilon_{seen}|=1054$ and $|\varepsilon_{unseen}|=143$. This results in roughly 90% of the examples having at least one entity that is seen. For more detailed statistics on the dataset see Table 2. For all examples in the test set, we attach the corresponding spans provided in the original dataset. We do not use these spans during training.

TABLE 4

Statistics of dataset used in the experiments. Note, the test set has a lot more unseen entities which facilitates the evaluation of the approach in the wild (open set). Also, during model training, we do not need access to spans, and therefore did not obtain span-level annotations for the RFE training set.

| | | Seen | | Unseen | | Disjoint-Spans |
|---|---|---|---|---|---|---|
| | | $\|\varepsilon_{seen}\|$ | # Examples | $\|\varepsilon_{unseen}\|$ | # Examples | Fraction of examples |
| RFE | Train | 450 | 6430 | n/a | n/a | unk |
| | Test | 73 | 266 | 66 | 863 | 13% |

TABLE 4-continued

Statistics of dataset used in the experiments. Note, the test set has a lot more unseen entities which facilitates the evaluation of the approach in the wild (open set). Also, during model training, we do not need access to spans, and therefore did not obtain span-level annotations for the RFE training set.

| | | Seen | | Unseen | | Disjoint-Spans |
|---|---|---|---|---|---|---|
| | | $\|\varepsilon_{seen}\|$ | # Examples | $\|\varepsilon_{unseen}\|$ | # Examples | Fraction of examples |
| hNLP | Train | 1054 | 4377 | n/a | n/a | 5% |
| | Test | 61 | 185 | 143 | 1018 | 7% |

Dataset Comparison

In Table 5, we quantitatively compare the overlap of entities between the datasets and make two observations.

First, there is a significant difference between the entity sets in both datasets (roughly 85% from hNLP to RFE and 69% from RFE to hNLP), although hNLP has twice the number of entities as the RFE dataset. We attribute the difference between the two datasets to their source; while RFE is derived from a telemedicine practice, hNLP is built from doctor's notes from in-patient settings. This is also evident when we look at the top frequent entities from these two datasets in Table 6 where hNLP focuses on more severe health issues (such as heart-related) that require hospitalization while RFE dataset focuses on non-urgent primary care services. However, they also share entities such as "vomiting."

Second, only a tiny fraction of unseen entities in one dataset is seen in the other. This gives the assurance that when we evaluate the cross-domain task we do not provide undue advantage to the model trained on the other dataset just because these unseen entities are known to the other dataset. Note that we did not intentionally construct the datasets this way and this result is a natural consequence of the significant difference in the vocabulary of the two datasets.

Results

Setup

Training details: For both self-alignment pretraining and label attention training, we use the ADAM optimizer with exponential decay after 1/10 of total steps and an effective batch size of 32. For self-alignment pretraining, we train the model for a total of 20 epochs with a learning rate of 2e-3 and the number of negatives set to 50. For label attention training, we train for a total 5 epochs with a learning rate of 2e-4 with the number of negatives set to 50. We set temperature $\tau$ to 0.07.

Prediction task: During inference, we compute the entity-attention scores for the ground-truth entities present in each input text. For experiments on the hHLP dataset, we compute the average entity-attention scores across all synonym terms associated with each ground-truth entity (identified by a UMLS CUI) as the exact matching synonym is not provided in the annotation. For the RFE dataset, we instead use the provided synonym term. Since the attention scores are normalized to sum up to 1, we manually set the threshold to be 0.05 during inference. Lastly, we also remove stop-words and punctuation marks from the predictions.

Metric: We use the per-token micro-F1 score as the primary metric for evaluating our models across all experiments. This is done by computing the per-token precision and recall based on the token overlaps between the predicted and ground-truth spans before averaging across all examples. We report the per-token micro-precision and recall performance in the Appendix A.

TABLE 5

Comparison of entities overlap between the two datasets. For each dataset (represented by rows), we present the number of entities in the training set (seen) and in the open set (unseen). In the columns corresponding to the other dataset, we provide the distribution of the occurrence of these entities in their seen and unseen concept distribution. The "Disjoint" column corresponds to the proportion of concepts not represented in the other dataset.

| | | RFE | | | hNLP | | |
|---|---|---|---|---|---|---|---|
| | | Seen | Unseen | Dis-joint | Seen | Unseen | Dis-joint |
| RFE | Seen (450) | 1 | 0 | 0 | .23 | .05 | .72 |
| | Unseen (73) | 0 | 1 | 0 | .09 | .24 | .67 |
| hNLP | Seen (1054) | .10 | .02 | .88 | 1 | 0 | 0 |
| | Unseen (185) | .12 | .04 | .84 | 0 | 1 | 0 |

TABLE 6

The table shows the top 15 frequent entities found in the two datasets.

| Dataset | Frequent entities |
|---|---|
| RFE | pregnancy (C0549206), headache (C0018681), dysuria (C0013428), cough (C0010200), abdominal pain (C0235309), nausea (C0027497), throat pain (C0242429), urinary tract infection (C0042029), delayed menstruation (C0240322), vaginal pruritus (C0042256), vaginal spotting (C2979982), fever (C0015967), crampy abdominal pain (C0344375), fatigue (C0015672), vomiting (C0042963) |
| hNLP | systemic arterial hypertension (C0020538), edema (C0013604), chest pain (C0008031), coronary artery disease (C1956346), pain (C0030193), dyspnea (C0013404), atrial fibrillation (C0004238), heart failure (C0018802), nausea (C0027497), vomiting (C0042963), bleeding (C0019080), intracerebral hemorrhage (C0038454), pneumonia (C0032285), cyanosis (C0010520), diabetes mellitus (C0011849) |

Baselines: We compare against strong baseline methods. The first method, Rule-based, is an in-house developed lookup-based approach that uses a sliding window strategy to find maximal matches of text corresponding to the entities and their synonyms. It ignores stop words while doing the match. For the second method, Fuzzy-Match, we adopt the fuzzy-string matching from the implementation by RapidFuzz, where spans with normalized Levenshtein Distance greater than a threshold are extracted for each entity. These two rule-based baselines are particularly strong because they are provided with the target entity. This means that all they have to do is match a known entity or its synonym to a span in the target text. In particular, these baselines have very high precision, since if they can find an entity or its synonym in the target text, then they are essentially guaranteed to have a perfect span extraction.

Lastly, we also compare against the attention scores without the self-alignment pretraining of entity representations, OSLAT (No Pretrain) trained on the RFE dataset. We did not see any significant difference when OSLAT (No Pretrain) on the hNLP dataset.

Results

Table 7 shows the micro-F1 score from our experiments compared with the three baseline methods, a break-down that include micro-recall and micro-precision can be found in Appendix A. OSLAT (RFE) and OSLAT (hNLP) are our models trained respectively on the RFE and hNLP dataset. OSLAT (No Pretrain) is a baseline OSLAT trained without the pretraining step on the RFE dataset.

Robustness to open set entity detection As described above, we report the results on both seen and unseen entities (during both stages of training) to evaluate the model's performance on open set entity detection. Although we see a slight degradation, our model generally performed well for unseen entities. Since the synonym set we train on often contains paraphrases of the same entity (e.g. stuffy nose, clogged nose), we hypothesize that our model learns to interpolate within the entity representation space and generalize to paraphrases for unseen entities based on the semantic knowledge encoded in original BioBERT.

Cross-domain evaluation In addition to the generalization of entities, we find that OSLAT also performs well in cross-domain settings. In particular, we were surprised to see that the OSLAT (RFE) outperformed all other approaches in three of the four benchmarks, with the only exception being the contiguous-span hNLP examples. It is worth mentioning that most of the single-span entities in hNLP are exact matches with one of the ground-truth entity's synonyms, making the job easier for rule-based methods. We believe the superior performance of the OSLAT (RFE) is due to the nature of the training data, since RFE data contains a lot more disjoint spans and implicitly mentioned entities, the model will encounter "harder" examples during training. We, therefore, conclude that training with diverse examples is more important than in-domain examples.

TABLE 7

For every approach (in columns 3 7), we evaluate their performance on both datasets, broken down by spans and also examples with seen and unseen entities, we report the Micro-F1 score along with the standard deviation of our models across 5 random seeds. An even more detailed breakdown can be found in Table A.1 of the Appendix. Note that for Rule-Based and Fuzzy Matching baselines we do not report separate seen and unseen values as these methods are provided ground truth entities and their synonyms for all examples.

| Dataset | Entities | OSLAT (No Pretrain) | OSLAT (RFE) | OSLAT (hNLP) | Rule-Based | Fuzzy |
|---|---|---|---|---|---|---|
| RFE | seen | 0.12 | 0.67 ± 0.01 | 0.63 ± 0.01 | — | — |
| Contiguous- | unseen | 0.11 | 0.59 ± 0.00 | 0.52 ± 0.00 | | |
| Span | all | 0.12 | 0.66 ± 0.00 | 0.57 ± 0.00 | 0.55 | 0.35 |
| RFE | seen | 0.05 | 0.56 ± 0.01 | 0.52 ± 0.01 | — | — |
| Disjoint- | unseen | 0.03 | 0.60 ± 0.01 | 0.41 ± 0.01 | | |
| Span | all | 0.05 | 0.57 ± 0.01 | 0.45 ± 0.01 | 0.23 | 0.2 |
| hNLP | seen | 0.02 | 0.80 ± 0.00 | 0.77 ± 0.01 | — | — |
| Contiguous- | unseen | 0.02 | 0.65 ± 0.01 | 0.73 ± 0.01 | | |
| Span | all | 0.02 | 0.69 ± 0.00 | 0.74 ± 0.01 | 0.74 | 0.79 |

TABLE 7-continued

For every approach (in columns 3 7), we evaluate their performance on both datasets, broken down by spans and also examples with seen and unseen entities, we report the Micro-F1 score along with the standard deviation of our models across 5 random seeds. An even more detailed breakdown can be found in Table A.1 of the Appendix. Note that for Rule-Based and Fuzzy Matching baselines we do not report separate seen and unseen values as these methods are provided ground truth entities and their synonyms for all examples.

| Dataset | Entities | OSLAT (No Pretrain) | OSLAT (RFE) | OSLAT (hNLP) | Rule-Based | Fuzzy |
|---|---|---|---|---|---|---|
| hNLP | seen | 0 | 0.56 ± 0.01 | — | — | — |
| Disjoint- | unseen | 0 | 0.43 ± 0.02 | 0.47 ± 0.00 | | |
| Span | all | 0 | 0.53 ± 0.01 | 0.47 ± 0.00 | 0.41 | 0.3 |

Handling disjoint spans Since medical entities in colloquial language are often mentioned in different locations within the input text (e.g. "I fell on my head, and now it really hurts."), we separately evaluate our models on subsets of the dataset consisting solely of contiguous and disjoint-span entities. In short, both of our models significantly outperform the baseline methods in the "disjoint-span" subset of both datasets, demonstrating the effectiveness of our model for extracting entities mentioned in multiple disjointed spans. The performance gain is most observed in the RFE dataset, where entities are often implicitly mentioned across the input text. The effectiveness of our approach can be attributed to the independent prediction at each token position, where regardless of the position within the input text, OSLAT is able to extract spans based on semantic similarity with the ground-truth entity representation.

Figure 6:
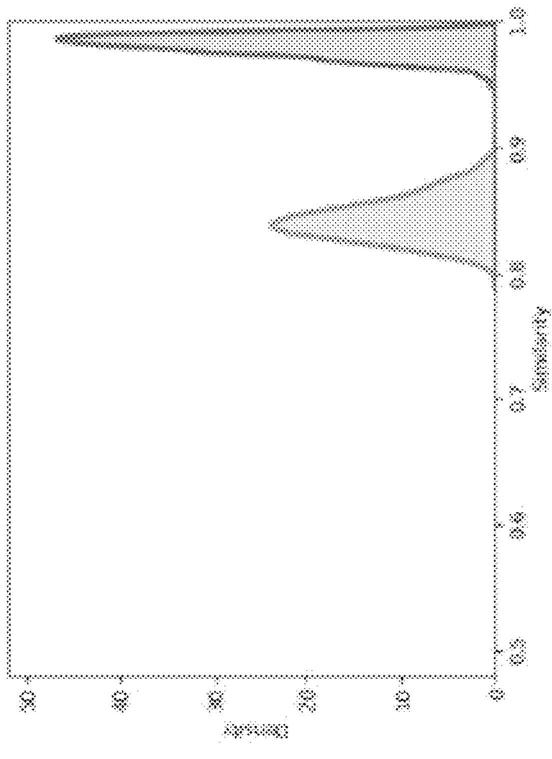
FIG. 6 illustrates a density plot of cosine similarities between 1000 positive (synonymous) and negative (nonsynonymous) entity pairs randomly sampled from $\varepsilon_{seen}$ (RFE).

Importance of pretraining FIG. 6(*a*) and FIG. 6(*b*) show the anisotropy in the BioBERT representations of medical entities before and after self-alignment pretraining. Density plot of cosine similarities between 1000 positive (synonymous) and negative (nonsynonymous) entity pairs randomly sampled from $\varepsilon_{seen}$ (RFE). Before pretraining the encoder could not differentiate representations of entity synonyms from non-synonyms, after the pretraining there is a dramatic shift fully separating synonyms from non-synonyms. Without pretraining BioBERT presents large embedding anisotropy. Before pretraining, the two overlapping curves demonstrate the inability of the encoder to distinguish between synonyms and randomly sampled entities. After pretraining, the synonyms are well separated from non-synonyms. Further, we can see the performance impact in Table 7, where the model fails to learn the task without self-alignment pretraining of the encoder.

The example embodiments enable rapidly creating span annotations in medical texts. This has direct relevance for training many downstream NLP tasks such as ICD coding, medical finding extraction, and conversational agent training. The example models use entity presence annotations within the text to implicitly find the corresponding spans. In order to support the large domain-specific vocabulary and varied phraseology present in the clinical text, example embodiments include a new model architecture: Open Set Label Attention Transformer (OSLAT). OSLAT (1) it uses the encoder not only to embed the target text but also the entity whose span needs to be extracted, (2) it is trained with a new loss, Label Synonym Supervised Normalized Temperature-Scaled Cross Entropy (LSS-NT-Xent), which allows us to train OSLAT on an open set of medical entities.

The system 500 can serve as a building block for many downstream applications. In particular, we can jointly train on LSS-NT-Xent, the loss function discussed above, with other learning objectives such as cross-entropy in classification to solve tasks in information retrieval, label bootstrapping, or as an intermediate component of end-to-end systems. A concrete example of IR is to enable physicians to search patient medical records for arbitrarily phrased concepts and find highlights of relevant historical discussions in the EHR.

APPENDIX J. DETAILED METRICS BREAKDOWN

In this section, we provide a detailed breakdown of the results from Table 7, where we discuss the recall-precision trade-off between our models and the two baseline methods. From the results in Table A.1, we see that while the RFE trained OSLAT achieved higher recall against both baseline methods, the rule-based model achieved higher precision across all datasets, with near-perfect precision for contiguous span entities. This is expected since the rule-based model has access to the ground-truth entity, the predictions it makes almost always exactly match with the entity or one of its synonyms. On the other hand, OSLAT can extract implicitly mentioned entities and disjoint-spans based on semantic similarity, resulting in a higher recall across all datasets. We leave the exploration of ensembling the two methods as a potential direction for future work. Lastly, it is worth mentioning that the precision and recall trade-off for OSLAT could be manually adjusted by tuning the prediction threshold of the attention scores. However, due to the limited size of our training set, we only report the performance for a fixed threshold (0.05).

TABLE A.1

The breakdown of the micro-precision and recall performance on both datasets. We report the results for both of our models and the two baseline methods along with the standard deviation across 5 random seeds.

| Dataset | Entities | Metric (Micro) | OSLAT (RFE) | OSLAT (hNLP) | Rule-Based | Fuzzy |
|---|---|---|---|---|---|---|
| RFE | seen | Precision | 0.69 ± 0.01 | 0.62 ± 0.01 | — | — |
| Continuous- | | Recall | 0.65 ± 0.00 | 0.69 ± 0.01 | | |
| Span | unseen | Precision | 0.59 ± 0.01 | 0.53 ± 0.01 | | |
| | | Recall | 0.59 ± 0.01 | 0.50 ± 0.01 | | |
| | all | Precision | 0.67 ± 0.01 | 0.57 ± 0.01 | 0.98 | 0.90 |
| | | Recall | 0.64 ± 0.00 | 0.58 ± 0.01 | 0.38 | 0.21 |
| RFE | seen | Precision | 0.61 ± 0.01 | 0.60 ± 0.01 | — | — |
| Disjoint- | | Recall | 0.51 ± 0.02 | 0.54 ± 0.01 | | |
| Span | unseen | Precision | 0.62 ± 0.02 | 0.51 ± 0.01 | | |
| | | Recall | 0.58 ± 0.01 | 0.38 ± 0.01 | | |
| | all | Precision | 0.61 ± 0.01 | 0.54 ± 0.01 | 0.95 | 0.64 |
| | | Recall | 0.53 ± 0.02 | 0.44 ± 0.01 | 0.12 | 0.12 |
| hNLP | seen | Precision | 0.67 ± 0.00 | 0.66 ± 0.02 | — | — |
| Continuous- | | Recall | 0.97 ± 0.00 | 0.92 ± 0.01 | | |
| Span | unseen | Precision | 0.52 ± 0.01 | 0.61 ± 0.01 | | |
| | | Recall | 0.88 ± 0.01 | 0.90 ± 0.00 | | |
| | all | Precision | 0.57 ± 0.01 | 0.61 ± 0.01 | 0.98 | 0.70 |
| | | Recall | 0.91 ± 0.01 | 0.90 ± 0.01 | 0.64 | 0.89 |
| hNLP | seen | Precision | 0.47 ± 0.02 | — | — | — |
| Disjoint- | | Recall | 0.71 ± 0.02 | | | |
| Span | unseen | Precision | 0.43 ± 0.02 | 0.45 ± 0.01 | | |
| | | Recall | 0.45 ± 0.02 | 0.47 ± 0.01 | | |
| | all | Precision | 0.44 ± 0.02 | 0.45 ± 0.01 | 0.72 | 0.49 |
| | | Recall | 0.51 ± 0.02 | 0.47 ± 0.01 | 0.33 | 0.32 |

010PRV

Dialogue-Contextualized Re-Ranking for Medical History-Taking

AI-driven medical history-taking is an important component in symptom checking, automated patient intake, triage, and other AI virtual care applications. As history-taking is extremely varied, machine learning models require a significant amount of data to train. To overcome this challenge, existing systems are developed using indirect data or expert knowledge. This leads to a training-inference gap as models are trained on different kinds of data than what they observe at inference time. Example embodiments provide a two-stage re-ranking approach that helps close the training-inference gap by re-ranking the first-stage question candidates using a dialogue-contextualized model. A global re-ranker cross-encodes the dialogue with all questions simultaneously. The global re-ranker incorporated with a transformer backbone resulted in a higher normalized discount cumulative gain (nDCG) and a higher mean average precision (mAP).

History taking is a critical component of a medical encounter. It involves collecting relevant patient-reported information such as presenting symptoms, patient concerns as well as the past medical, psychological and social history. This information forms the basis of subsequent patient triage, diagnosis, and care planning. While history taking is an important component of the medical encounter, it is also one of the most time-consuming components and when done incompletely can lead to triage, diagnostic, and treatment errors.

In an example embodiment, an expert system uses a relatively small amount of real medical professional-patient dialogue data to close this training-inference gap. Using "retrieve and re-rank" for computationally efficient retrieval of documents from a large corpus, example embodiments include a "retrieve" part performed by the expert systems which retrieves a list of possible questions to ask the patient, and a dialogue-trained re-ranker then "re-ranks" the possible questions. Because the re-ranking model takes the original expert system's candidate questions, it does not need to predict over the space of all possible questions. Instead, it only needs to re-rank from a much smaller subset. The machine learning model takes both the previous dialogue and the possible questions as free text entries, which means that the system can operate even if the underlying expert system is replaced with something else.

Example embodiments use a two-step approach to history-taking question selection where we use an expert system to retrieve a list of candidate questions and then use a machine-learned re-ranker to get the top question to ask. A "global re-ranker" embeds both the preceding dialogue and candidate questions into a single long string. We then train long context language models to predict the relevance of each question simultaneously.

In an example embodiment, a global reranker 700 in FIG. 7 concatenates all candidate documents into a single input that is then processed by a long context language model.

Closing the Train-Inference Gap with Re-Ranking

Figure 8:
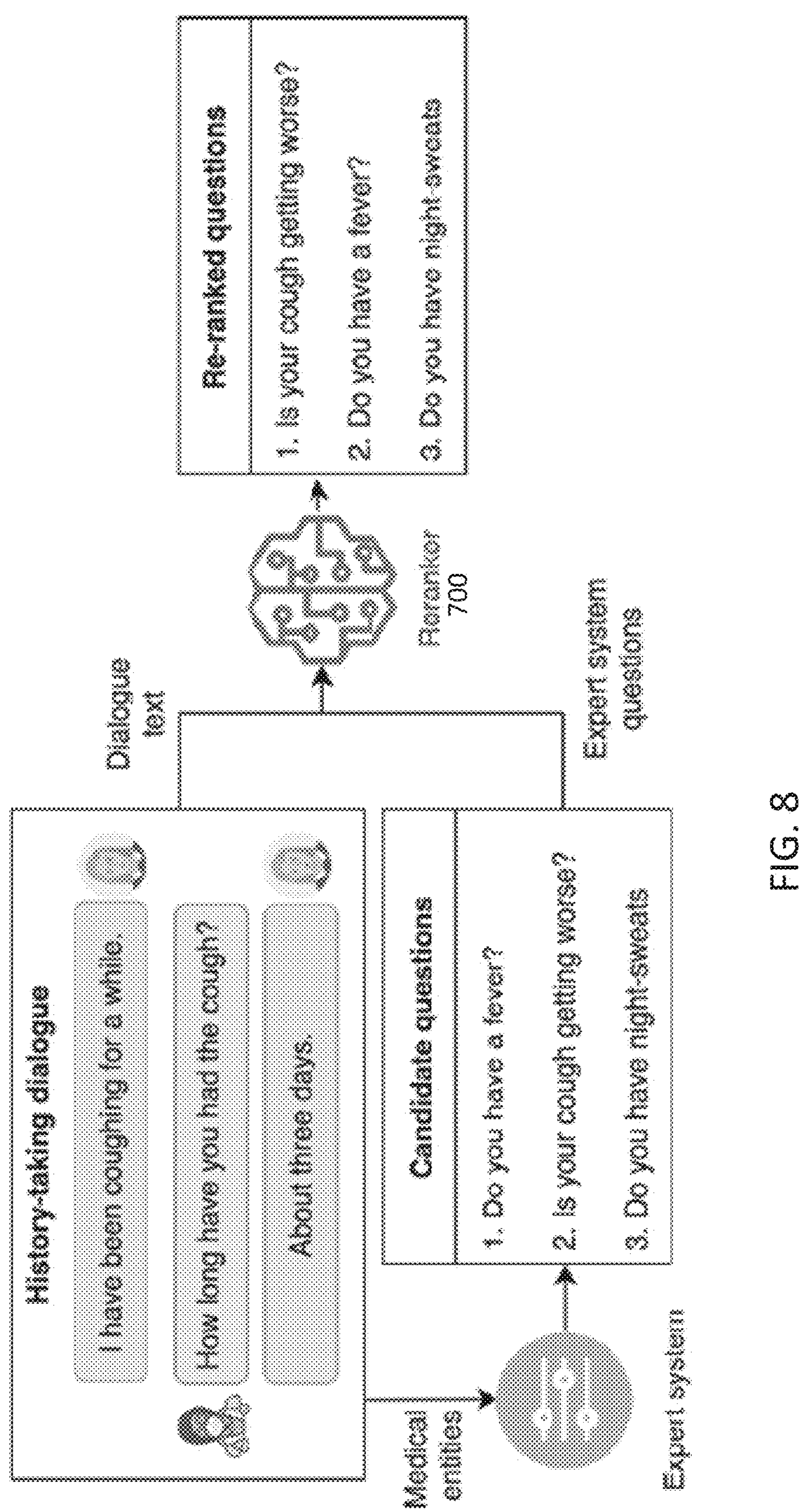
FIG. 8. illustrates an overview of the two-stage history-taking workflow.

An overview of the approach to closing the train-inference gap in an existing history-taking system can be seen in FIG. 8. An expert system suggests relevant history-taking questions and then use a deep neural network contextualized by the entire medical professional-patient dialogue to re-rank expert system suggestions.

The goal of re-ranking is, given the prior dialogue context d and a list of n candidate history-taking questions $Q=[q_1, q_2, \ldots, q_n]$, to generate a new list Q' which consists of (possibly reordered) questions from Q such that the higher relevance questions appear earlier in the sequence. In our case, the candidate questions are generated using an in-house Expert System, and the ground truth labels $y=[y_1, y_2, \ldots, y_n]$, $y_i \in \{0, 1\}$ represent whether a medical professional asked a given recommended question (1 if the question was asked, 0 if the question was not asked). A doctor may ask multiple questions at the same time, thus multiple elements of y can have a value of 1, see § 5.1 for more details on how the ground truth is produced. Finally, in all of the models studied in this work, the re-ranking is achieved by assigning scores $s=[s_1, s_2, \ldots, s_n]$ to each question in Q, and then constructing Q' by reordering using scores in s.

Global Re-Ranker 700

The global re-ranker is an accurate and efficient listwise re-ranking method. In this approach, the history-taking dialogue and all candidate history-taking questions are concatenated into a single text input, using which the model then assigns the ranking scores to all questions simultaneously. The global re-ranker 700 directly encodes all texts through the language model, thereby ensuring deep semantic interactions not only between the dialogue and the candidate questions but also between all candidate questions.

The input text to the global re-ranker 700 is the concatenation of both the dialogue context and all the candidate questions: [CLS] d [SEP] $q_1$ [$MASK_1$] [SEP] $q_2$ [$MASK_2$] [SEP] . . . $q_n$ [$MASK_n$] [SEP], where the [SEP] token is used to mark the boundaries of candidate questions. The [$MASK_i$] token is the pooling token for the preceding question $q_i$. For each pooling token [$MASK_i$], the global reranker predicts a score $s_i$, which represents the relevance for $q_i$. We also added type embeddings to every input tokens to indicate whether it belongs to the dialogue or the candidate questions.

While self-attention itself does not assume any inherent order of the input sequence, pretrained transformer models usually encode the text sequentially due to the presence of positional embeddings. In the current task, it is expected that a language model learns the sequential relations between words within d and $q_i$. From our ablation experiments, we found that the best performance is achieved when the model is agnostic to the order of input questions $[q_1, q_2, \ldots, q_n]$. In order to remove the positional bias, we reset the positional embedding when each new question starts.

We selected three different neural architectures to implement the global ranker 700, all of which can process long textual sequences. The first two approaches are based on the Nystromformer. We experiment with Nystromformer with both Nystrom attention turned on and turned off (in which case it uses full attention). We use Nystromformer as the base of our "full attention" transformer because this enables us to leverage the pretrained Nystromformer checkpoints that had been trained on long texts and retain the good performance of full attention. We learned from pilot experiments that other efficient transformers such as Longformer failed to converge. The third neural architecture is a state-space model, S4, which has been shown to process long sequences more effectively than many transformers.

TABLE 8

Statistics of different data splits. Text lengths were calculated based on words.

| | Train | Dev | Test |
|---|---|---|---|
| Num. Encounters | 12105 | 311 | 655 |
| Num. Samples | 26106 | 626 | 1361 |
| Avg. Length of Dialog. | 287.2 | 374.7 | 288.8 |
| Num. Selected Questions | 4.0 | 3.8 | 4.1 |
| Num. Candidate Questions | 27.9 | 26.6 | 28.1 |
| Avg. Length of Questions | 8.0 | 8.1 | 8.0 |

To train the global re-ranker 700, we compared a variety of loss functions across point-wise, pair-wise and listwise approaches in the learning-to-rank framework. The pointwise baseline was trained with binary cross-entropy. For pairwise loss functions, we tested the RankNet and LambdaRank. The listwise loss functions we used were ListNet, ListMLE, ApproxNDCG and NeuralNDCG, the latter two of which directly optimized the Normalized Discounted Cumulative Gain (NDCG) metrics.

Experiments

Data

The medical dialogue data was collected from a portion of real medical professional-patient interactions collected on a text-based medical service platform. In a typical interaction, the physician asks a series of history-taking questions that can be entered either as free text or selected from a list of recommendations. These recommendations are made using the Expert System that forms the first stage in our proposed workflow. At each dialogue turn where recommended questions are asked, the medical professional selected questions are marked as relevant and the not-selected questions are marked as irrelevant. This forms a natural dataset of medical professional annotated selections on which we train our re-rankers.

The dataset comprises 13071 encounters. Non-history-taking dialogue turns were filtered out with our in-house dialogue segmentation model (Manuscript revealed for camera-ready version). The detailed statistics of our data are displayed in Table 8.

Metrics

For evaluation, we adopted two common ranking metrics, normalized discounted cumulative gain (nDCG) and mean average precision (mAP). The mAP assumes binary relevance whereas nDCG can work with both binary and continuous relevance. Specifically for global re-rankers, the average metrics over 5 repeated runs of evaluations were reported. In each run, the order of candidate questions fed to the global re-ranker was randomly reshuffled to mitigate positional biases.

Baseline Approaches

In addition to the global ranker 700, we also implement three widely adopted baseline ranking approaches: bi-encoder, cross-encoder, and autoregressive re-ranker.

Bi-encoder. In the bi-encoder architecture, the dialogue query and the candidate questions are encoded by two separate encoders $f_D$ and $f_Q$, and the relevance score between the two resulting vector representations are computed with cosine similarity. The bi-encoder learns an embedding space where the dialogue representation is close to the most relevant questions while being distant from less relevant questions. The training objective is to minimize the InfoNCE loss function [31] through contrastive learning with 7 negatives randomly sampled from the list of recommended candidate questions by the Expert System. The temperature parameter of the InfoNCE loss was set to 0.05 throughout the training.

Cross-encoder. In the cross-encoder architecture the prior dialogue is concatenated with a candidate question. The cross-encoder fc assigns a relevance score to this candidate question using a classification head on top of the contextual representation of the dialogue and the query. We consider transformers and S4-based models. For transformers, the [CLS] token is treated as the contextual representation. For the bi-directional S4 re-rankers, we use average pooling of the last layer to obtain the contextual representations. All cross-encoder variants are trained with the binary cross-entropy loss.

Autoregressive re-ranker. We also consider autoregressive re-rankers [29,33]. For a transformer baseline, we use a pre-trained LongT5. The query and the document are concatenated together to form the input sequence: Query: d Document: $q_i$ Relevant: which is fed into the encoder. The decoder then predicts true for relevant documents or false for irrelevant documents. During inference, a softmax function is applied to the logits of the true and the false tokens to normalize the results across multiple queries.

For autoregressive S4, when we followed the Long-T5 method, we found it to highly unstable and failed to converge, similar to what was found in the literature on its dependency certain keywords e.g., true/false. Therefore, we followed the same setting as in the cross-encoder, except that the underlying model is autoregressive rather than bi-directional. Here, the concatenated dialogue and a candidate question are fed into the S4 re-ranker and the average pooling of the last layer is classified as either relevant or irrelevant through a classification head.

Implementation

S4 model pretraining. The S4 model was based on the original implementation of S4 language model, in which the S4 layers were used as a drop-in replacement for the self-attention layers in a typical transformer. We implemented a 12-layer bidirectional and autoregressive S4 models. We set the hidden dimensions to 768 in order to match the parameter count of mainstream pretrained transformers (such as BERT-base), and the number of state-space machines (SSM) to 128 with 64 states for each SSM.

Both bidirectional S4 and autoregressive S4 models were pretrained on large-scale texts. The autoregressive S4 was pretrained with the casual language modeling task on the whole English subset of Wikipedia. The second iteration of pretraining, initialized with the pretrained Wikipedia checkpoint, was on the whole Pubmed PMC Open Access Subset. The bidirectional S4 models were pretrained on the same datasets but with the mask language modeling task using the same masking settings as in BERT. The maximum sequence length for pretraining was set to 8192 and the effective batch size was 256.

All models were optimized with AdamW optimizer with a learning rate of 1e-4 and the learning rate was dynamically adjusted using the Cosine Scheduler with a warm-up step of 1000. The pretraining took place on 8×RTX 3090 GPU with 24 GB of memory. The training was stopped when the evaluation loss stopped to decrease (~12 k steps for all models). The autoregressive and bi-direction checkpoints pre-trained on these datasets will be released together with this paper.

Transformer implementation. Transformer models were all implemented through the Transformers package with default dimensions. The autoregressive model was LongT5 initialized by the long-t5-tglobal-base checkpoint. Other transformers were based on the Nystromformer with initialization from the public checkpoint uw-madison/nystromformer-4096.

Re-ranker training. For global re-rankers, the maximum input length was set to 4096 with an effective batch size of 32. For other models, the effective batch size was 64 and the maximum length was 2048, as this length was enough to cover almost all of the data samples. Models were trained with a maximum of 5 epochs and only the model with the best validation performance was kept. All models were trained using the AdamW optimizer with a learning rate of 5e-5. We used a cosine scheduler with a warm-up step of 1000 to automatically adjust the learning rate during training. All ranking models were trained on a single V100 GPU with 16 GB of memory.

Results

Main Results

Our main results are summarized in Table 9. All neural re-ranking models out-perform the baseline Expert System in both metrics, suggesting that re-ranking does up-rank the more relevant history-taking questions. Among the neural base-lines, the transformer-based cross-encoder outperforms the bi-encoder. The LongT5 autoregressive re-ranker, despite having more parameters (220M parameters), also performs worse than the cross-encoder (~110M parameters).

TABLE 9

Results of reranking experiments.

| | Dev | | Test | |
|---|---|---|---|---|
| Model | nDCG | mAP | nDCG | mAP |
| Expert System (Baseline) | 0.592 | 0.383 | 0.570 | 0.349 |
| Bi-encoder (Transformer) | 0.690 | 0.548 | 0.677 | 0.531 |
| Cross-encoder | | | | |
| Transformer | 0.718 | 0.584 | 0.706 | 0.566 |
| Nystromformer | 0.653 | 0.496 | 0.654 | 0.497 |
| Bidirectional S4 (Wiki Pretraining) | 0.648 | 0.490 | 0.641 | 0.481 |
| Bidirectional S4 (Pubmed Pretraining) | 0.643 | 0.483 | 0.630 | 0.464 |
| Autoregressive Re-ranker | | | | |
| LongT5-base | 0.690 | 0.546 | 0.678 | 0.529 |
| Autoregressive S4 (Wiki Pretraining) | 0.658 | 0.502 | 0.648 | 0.490 |
| Autoregressive S4 (Pubmed Pretraining) | 0.654 | 0.498 | 0.642 | 0.484 |
| Global Re-ranker Transformer | | | | |
| +Pointwise loss: BCE | 0.744 | 0.618 | 0.743 | 0.618 |
| +Pairwise loss: RankNet | 0.739 | 0.612 | 0.735 | 0.603 |
| +Pairwise loss: LambdaLoss | 0.739 | 0 616 | 0.739 | 0.612 |
| +Listwise loss: ListNet | 0.737 | 0.609 | 0.740 | 0.610 |
| +Listwise loss: ListMLE | 0.727 | 0.597 | 0.721 | 0.587 |
| +Listwise loss: ApproxNDCG | 0.701 | 0.555 | 0.697 | 0.550 |
| +Listwise loss: NeuralNDCG | 0.742 | 0.617 | 0.741 | 0.612 |
| Nystromformer | | 0.537 | | 0.530 |
| +Pointwise loss: BCE | 0.684 | | 0.678 | |
| Bidirectional S4 (Wiki Pretraining) | 0.667 | 0.516 | 0.663 | 0.510 |
| +Pointwise loss: BCE | | | | |
| Bidirectional S4 (PubMed Pretraining) | | | | |
| +Pointwise loss: BCE | 0.697 | 0.556 | 0.670 | 0.518 |

The best performance is achieved by the global re-ranker 700 for both transformer and S4 architectures, regardless of the loss functions chosen. Among the various loss functions, the pointwise binary cross-entropy (BCE) performs the best. Our hypothesis is that since our ground truth relevance scores are binary rather than continuous, the current task does not make full use of the listwise loss functions.

The effectiveness of the global re-ranker lies in the fact that it attends to the semantic interactions not only between the dialogue and the candidate questions but also between the candidate questions themselves. This allows the model to exploit the dependencies between history-taking questions, such as co-occurrence statistics, to improve ranking outcomes.

It is also worth noting that, despite its outstanding performance in some long sequence processing benchmark, S4 still lags behind transformers in the current task. One reason could be that the S4 model here has not been pretrained on texts, while transformers have been pre-trained on large amounts of texts. Furthermore, the text sequences in our task range from a few hundred to about three thousand words, which might not be long enough for S4 to reveal its full potential.

Ablation Analysis

We conducted ablation analyses on the global re-ranker to assess the impact of dialogue context length, the effect of type embeddings, and the effect of shuffling candidate question order. The results are displayed in Table 10.

Context length ablations. When ablating on context length, only the last N tokens of the dialogue were considered (full model is 4096 tokens, ablation are 3072, 2048, and 1024 tokens). While most of the text sequences were shorter than 1000 tokens, truncating texts still decreases test performance on some text sequences that are particularly long (longer than 1024), as some important information could be removed. In general, the global re-ranker benefits from getting more dialogue contexts, though this benefit seems to diminish after expanding to more than 2048 tokens.

Effect of position and type embeddings. We find that the removal of type embeddings (which are learned embeddings that differentiate whether the token is from dialogue or a candidate question) has almost no impact on the test performance. We reset the positional embeddings for each candidate questions in the input sequence, as this might help the model learn to be agnostic to the order of questions. We trained a model that used sequential positional embeddings for the input sequence. It turned out that positional embeddings played a minor role in training the global re-ranker.

Effect of shuffling. We tested the importance of permutation invariance with regard to the order of input candidate questions. The list of candidate questions $[q_1, q_2, \ldots, q_n]$ were concatenated with the prior dialogue as an input to the model. We found that while the expert system should produce questions in order or relevance, performance was significantly higher when the model was trained with shuffled order. We believe that this forces the model to learn to re-rank the questions without falling back to the original order of the candidate questions.

In this disclosure, we address an important problem of closing the training-inference gap for automated medical history-taking. The re-ranker 700 has two stages: (1) we use an expert system to suggest a list of candidate questions (out of possible thousands), (2) we train a machine-learned re-ranking model to re-rank expert system-suggested questions based on the free text of the medical professional-patient dialogue.

TABLE 10

Results of ablation studies on global re-ranker

| | Dev | | Test | |
|---|---|---|---|---|
| Ablation | nDCG | mAP | nDCG | mAP |
| Maximum length: 4092 (Full) | 0.744 | 0.618 | 0.743 | 0.618 |
| Maximum length: 3072 | 0.741 | 0.614 | 0.739 | 0.611 |
| Maximum length: 2048 | 0.746 | 0.622 | 0.747 | 0.622 |
| Maximum length: 1024 | 0.747 | 0.623 | 0.737 | 0.609 |
| No type embedding | 0.733 | 0.610 | 0.732 | 0.607 |
| Sequential position embedding | 0.749 | 0.625 | 0.741 | 0.613 |
| No random shuffling of questions | 0.515 | 0.313 | 0.523 | 0.319 |

To perform re-ranking (stage 2), we introduce a new approach which we call "global re-ranker", and compare it to existing neural baselines. We also explore several language model back-bones including various transformers and structure-state-space (S4) models (As part of this publication, we release bi-directional and autoregressive S4 checkpoints pre-trained on the English Wikipedia and Pubmed PMC Open Access Subset). We find that while all neural re-ranking models out-perform the original expert system, the global re-ranker with a full-attention transformer backbone performs the best with a 30% increase in nDCG and 77% increase in mAP over the first-stage recommendations.

While results directly show the effectiveness of training a re-ranking model on top of an expert system for history taking, this approach can also be applied to other decision support systems. The conditions under which this approach is beneficial are the following: (1) There exists a scoring system that has a training-inference gap (2) The space of possible predictions is very large, and as such would require a lot of data to machine-learn from scratch. One example beyond history-taking where these conditions are satisfied is medical diagnosis prediction. There are many expert-system-derived diagnosis models, and training a diagnosis model from scratch can be difficult as the space of possible diagnosis is very large. Re-ranking could be used to close the gap between an off-the-shelf diagnostic expert system and the practice's actual patient population outcomes.

FIG. 9 is a flowchart illustrating a routine 900 that may be executed by the system 500. In block 902, at least one processor receives a digital speech signal. In block 904, the at least one processor converts the digital speech signal to text. In block 906 self-alignment pre-training is performed of an encoder on entities and their synonyms. In block 908, label attention training the pretrained encoder is performed by aligning label-text joint representation to that of label synonym-text joint representations. In block 910, the trained encoder identifies entities in a span in the text.

FIG. 10 is a flowchart illustrating a routine 1000 that may be executed by the system 700. In block 1002, at least one processor receives a digital speech signal. In block 1004, the at least one processor converts the digital speech signal to text. In block 1006, self-alignment pre-training of an encoder is performed on entities and their synonyms. In block 1008, label attention training the pretrained encoder is performed by aligning label-text joint representation to that of label synonym-text joint representations. In block 1010, the trained encoder identifies entities in a span in the text. In block 1012, medical entities in the text are identified. In block 1014, an expert system generates candidate questions based on the identified medical entities. In block 1016, a machine-learned deep neural network reranker reranks the generated candidate questions based on the text. In block 1018, a first-ranked question of the reranked questions or all of the reranked questions is presented to a device.

Figure 11:
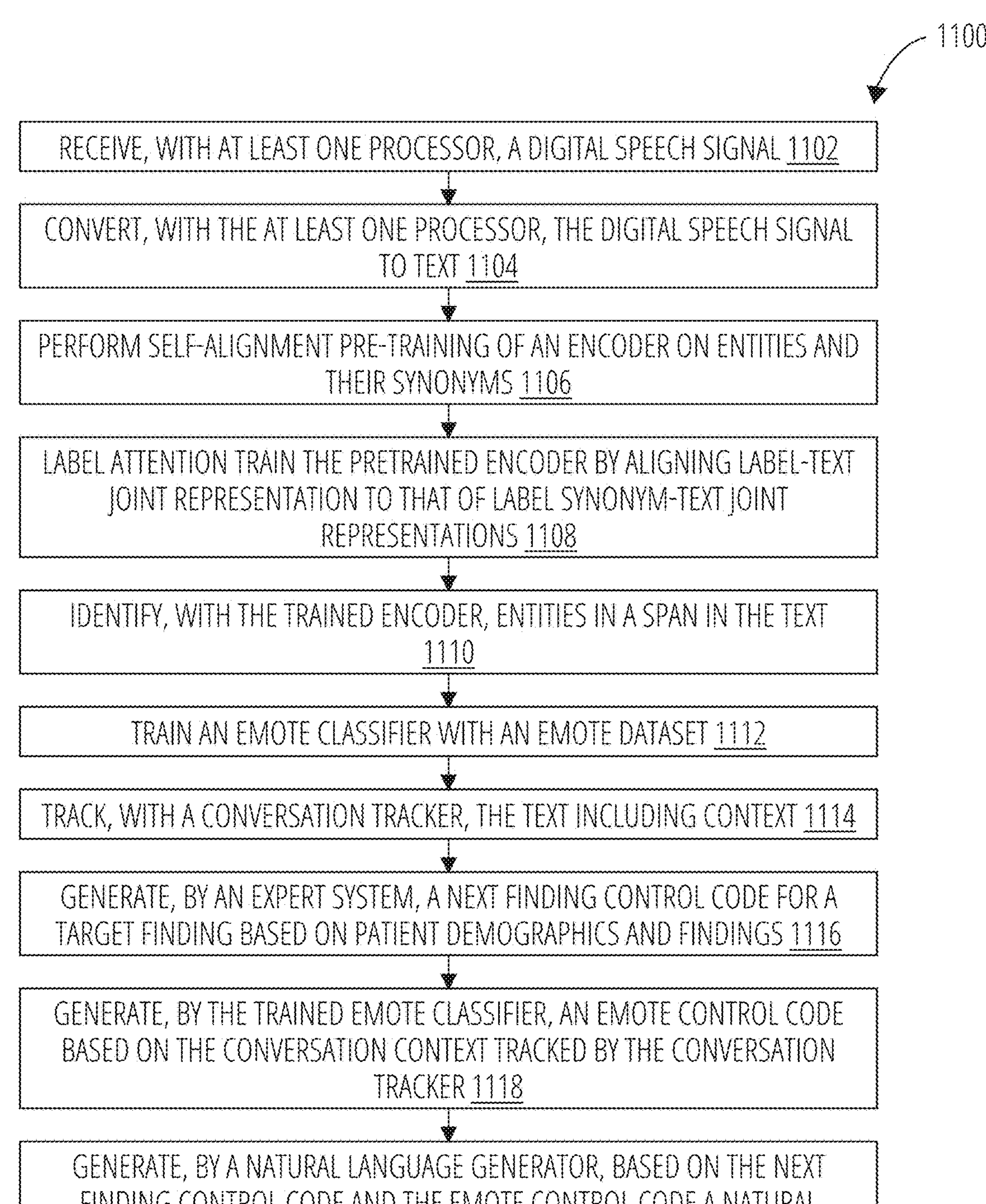
FIG. 11 illustrates a routine in accordance with one embodiment.

FIG. 11 is a flowchart illustrating a routine 1100 that may be executed by the system 200. In block 1102, at least one processor receives a digital speech signal. In block 1104, the at least one processor converts the digital speech signal to text. In block 1106, self-alignment pre-training of an encoder is performed on entities and their synonyms. In block 1108, label attention training of the pretrained encoder is performed by aligning label-text joint representation to that of label synonym-text joint representations. In block 1110, the trained encoder identifies entities in a span in the text. In block 1112, an emote classifier is trained with an emote dataset. In block 1114, a conversation tracker tracks the text including context. In block 1116, an expert system generates a next finding control code for a target finding based on patient demographics and findings. In block 1118, the trained emote classifier generates an emote control code based on the conversation context tracked by the conversation tracker. In block 1120, a natural language generator generates based on the next finding control code and the emote control code a natural language question about the target finding.

Figure 12:
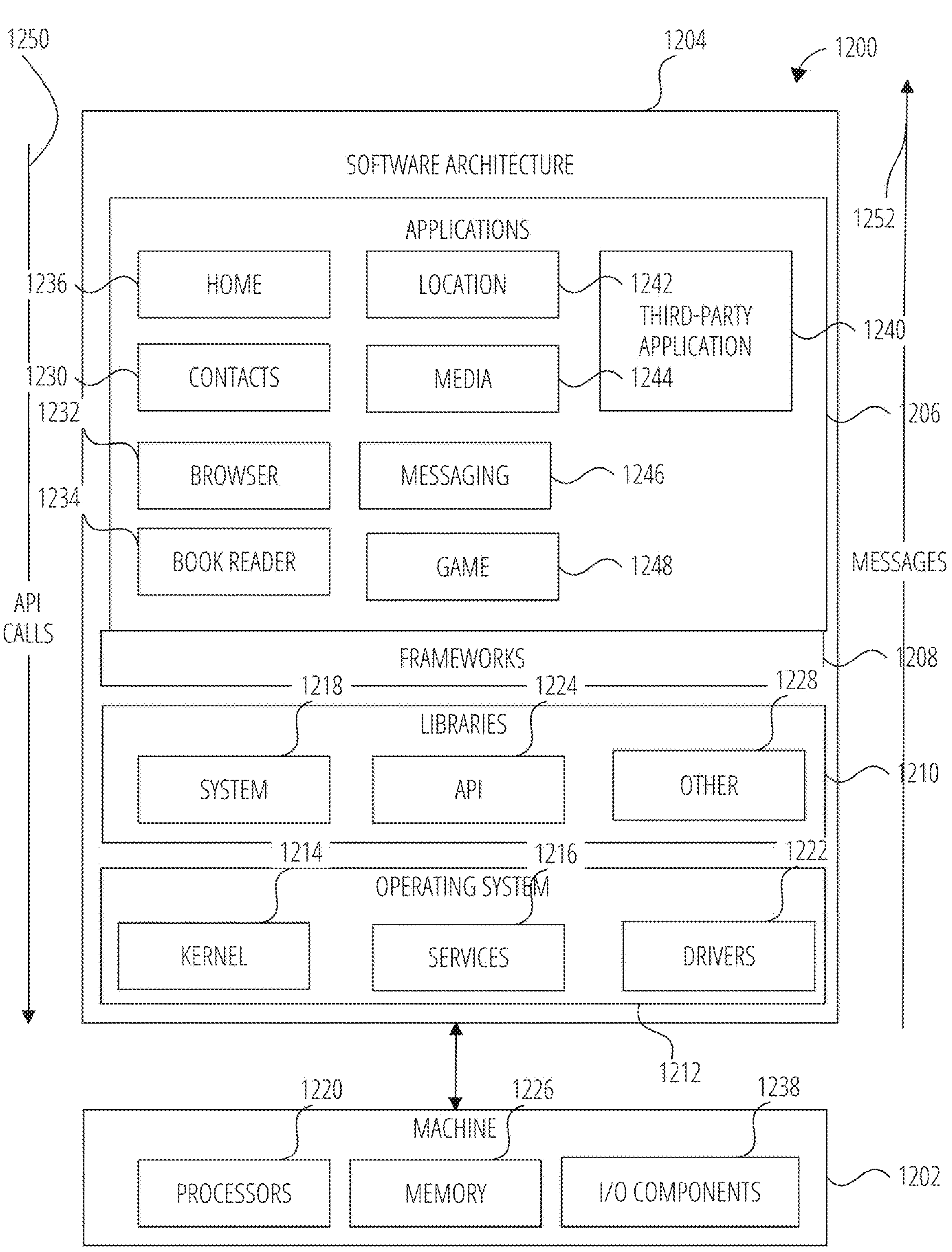
FIG. 12 is a block diagram showing a software architecture within which the present disclosure may be implemented, according to some examples.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, Processor management (e.g., scheduling), component management, networking, and security settings, among other functionalities. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, and power management drivers.

The libraries 1210 provide a low-level common infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., Web Kit to provide web browsing functionality), and the like. The libraries 1210 can also include a wide variety of other libraries 1228 to provide many other APIs to the applications 1206.

The frameworks 1208 provide a high-level common infrastructure used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In some examples, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 1240 can invoke the API calls 1250 provided by the operating system 1212 to facilitate functionality described herein.

Figure 13:
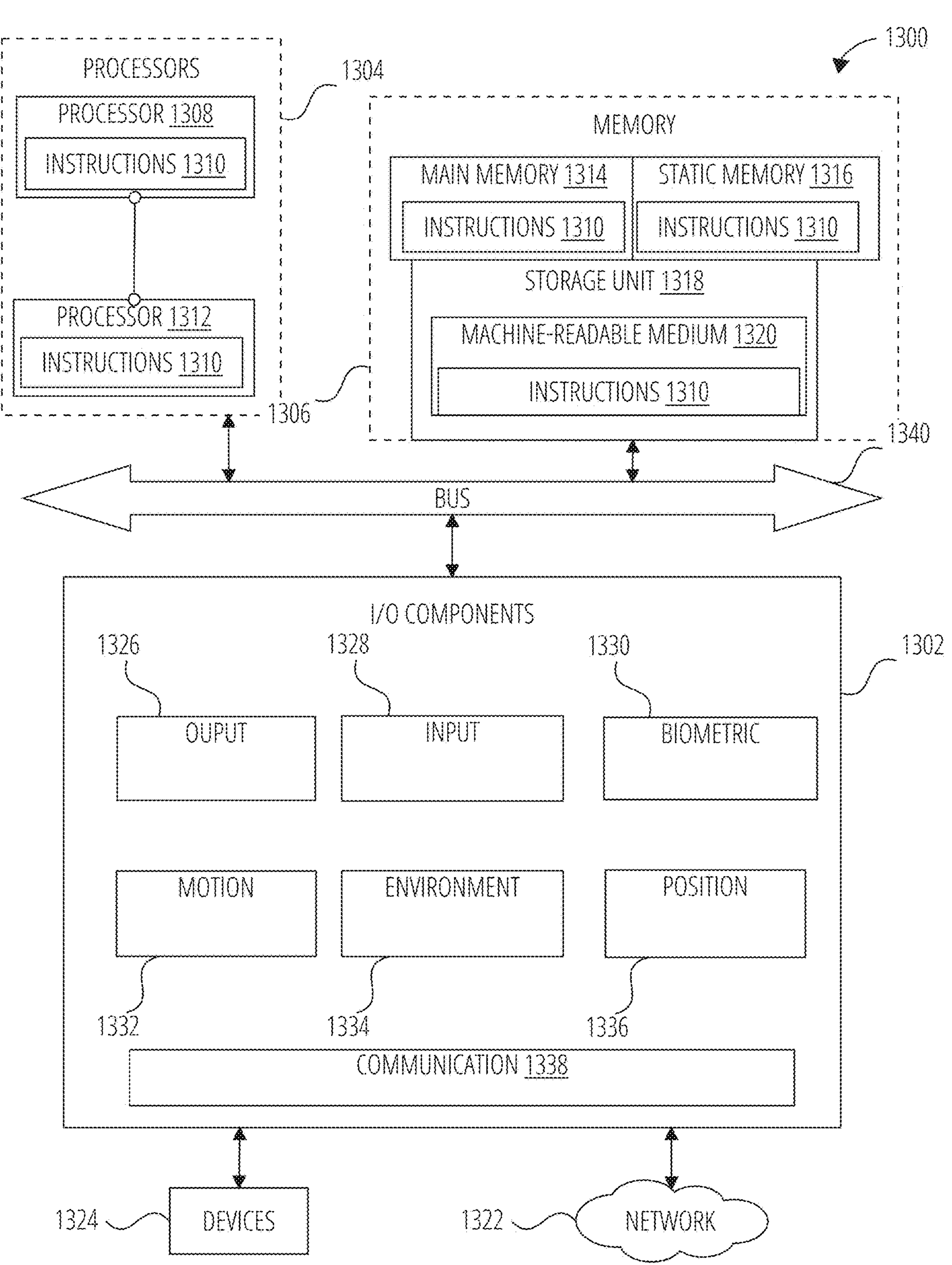
FIG. 13 is a diagrammatic representation of a machine in the form of a computer system within which a set of instructions may be executed for causing the machine to perform any one or more of the methodologies discussed herein, in accordance with some examples.

FIG. 13 is a diagrammatic representation of the machine 1300 within which instructions 1310 (e.g., software, a program, an application, an applet, an app, or other executable code) for causing the machine 1300 to perform any one or more of the methodologies discussed herein may be executed. For example, the instructions 1310 may cause the machine 1300 to execute any one or more of the methods described herein. The instructions 1310 transform the general, non-programmed machine 1300 into a particular machine 1300 programmed to carry out the described and illustrated functions in the manner described. The machine 1300 may operate as a standalone device or be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1310, sequentially or otherwise, that specify actions to be taken by the machine 1300. Further, while a single machine 1300 is illustrated, the term "machine" may include a collection of machines that individually or jointly execute the instructions 1310 to perform any one or more of the methodologies discussed herein.

The machine 1300 may include processors 1304, memory 1306, and I/O components 1302, which may be configured to communicate via a bus 1340. In some examples, the processors 1304 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), another Processor, or any suitable combination thereof) may include, for example, a Processor 1308 and a Processor 1312 that execute the instructions 1310. The term "Processor" is intended to include multi-core processors that may comprise two or more independent processors (sometimes referred to as "cores") that may execute instructions contemporaneously. Although FIG. 13 shows multiple processors 1304, the machine 1300 may include a single processor with a single core, a single processor with multiple cores (e.g., a multi-core processor), multiple processors with a single core, multiple processors with multiples cores, or any combination thereof.

The memory 1306 includes a main memory 1314, a static memory 1316, and a storage unit 1318, both accessible to the processors 1304 via the bus 1340. The main memory 1306, the static memory 1316, and storage unit 1318 store the instructions 1310 embodying any one or more of the methodologies or functions described herein. The instructions 1310 may also reside, wholly or partially, within the main memory 1314, within the static memory 1316, within machine-readable medium 1320 within the storage unit 1318, within the processors 1304 (e.g., within the processor's cache memory), or any suitable combination thereof, during execution thereof by the machine 1300.

The I/O components 1302 may include various components to receive input, provide output, produce output, transmit information, exchange information, or capture measurements. The specific I/O components 1302 included in a particular machine depend on the type of machine. For example, portable machines such as mobile phones may include a touch input device or other such input mechanisms, while a headless server machine will likely not include such a touch input device. The I/O components 1302 may include many other components not shown in FIG. 13. In various examples, the I/O components 1302 may include output components 1326 and input components 1328. The output components 1326 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), or other signal generators. The input components 1328 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 1302 may include biometric components 1330, motion components 1332, environmental components 1334, or position components 1336, among a wide array of other components. For example, the biometric components 1330 include components to detect expressions (e.g., hand expressions, facial expressions, vocal expressions, body gestures, or eye-tracking), measure biosignals (e.g., blood pressure, heart rate, body temperature, perspiration, or brain waves), or identify a person (e.g., voice identification, retinal identification, facial identification, fingerprint identification, or electroencephalogram-based identification). The motion components 1332 include acceleration sensor components (e.g., accelerometer), gravitation sensor components, rotation sensor components (e.g., gyroscope). The environmental components 1334 include, for example, one or cameras, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1336 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1302 further include communication components 1338 operable to couple the machine 1300 to a network 1322 or devices 1324 via respective coupling or connections. For example, the communication components 1338 may include a network interface Component or another suitable device to interface with the network 1322. In further examples, the communication components 1338 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1324 may be another machine or any of a wide variety of peripheral devices (e.g., a peripheral device coupled via a USB).

Moreover, the communication components 1338 may detect identifiers or include components operable to detect identifiers. For example, the communication components 1338 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Data glyph, Maxi Code, PDF417, Ultra Code, UCC RSS-2D bar code, and other optical codes), or acoustic detection components (e.g., microphones to identify tagged audio signals). In addition, a variety of information may be derived via the communication components 1338, such as location via Internet Protocol (IP) geolocation, location via Wi-Fi® signal triangulation, or location via detecting an NFC beacon signal that may indicate a particular location.

The various memories (e.g., main memory 1314, static memory 1316, and/or memory of the processors 1304) and/or storage unit 1318 may store one or more sets of instructions and data structures (e.g., software) embodying or used by any one or more of the methodologies or functions described herein. These instructions (e.g., the instructions 1310), when executed by processors 1304, cause various operations to implement the disclosed examples.

The instructions 1310 may be transmitted or received over the network 1322, using a transmission medium, via a network interface device (e.g., a network interface component included in the communication components 1338) and using any one of several well-known transfer protocols (e.g., hypertext transfer protocol (HTTP)). Similarly, the instructions 1310 may be transmitted or received using a transmission medium via a coupling (e.g., a peer-to-peer coupling) to the devices 1324.

EXAMPLES

1. A method of speech signal processing using artificial intelligence, comprising:

optionally receiving, with at least one processor, a digital speech signal;

optionally converting, with the at least one processor, the digital speech signal to text;

performing self-alignment pre-training of an encoder on entities and their synonyms;

label attention training the pretrained encoder by aligning label-text joint representation to that of label synonym-text joint representations; and identifying, with the trained encoder, entities in a span in the text.

2. The method of example 1, wherein the label attention training uses loss leverage.

3. The method of any of the preceding examples, wherein the loss leverage includes mapping, with a two-level feed-forward projection head, the representations into a low-dimensional space; and wherein the loss leverage is a supervised contrastive loss.

4. The method of any of the preceding examples, wherein the encoder jointly encodes labels and targets texts into a same subspace.

5. The method of any of the preceding examples, wherein the digital speech signal includes a doctor-patient dialogue.

6. The method of any of the preceding examples, wherein the span is disjointed.

7. The method of any of the preceding examples, further comprising:

training an emote classifier with an emote dataset;

tracking, with a conversation tracker, the text including context;

generating, by an expert system, a next finding control code for a target finding based on patient demographics and findings;

generating, by the trained emote classifier, an emote control code based on the conversation context tracked by the conversation tracker; and generating, by a natural language generator, based on the next finding control code and the emote control code a natural language question about the target finding.

8. The method of any of the preceding examples, wherein the emote dataset comprises a set of emote phrases and corresponding emote control codes and patient and medical professional dialogue turns that preceded the use of the emote phrase.

9. The method of any of the preceding examples, wherein the emote control codes are one of affirmative, empathy, apology, and none.

10. The method of any of the preceding examples, further comprising training the natural language generator with a medical conversations dataset.

11. The method of any of the preceding examples, wherein the medical conversations dataset comprises dialogue context, next finding control codes, emote control codes, and medical finding questions with emotional responses.

12. The method of any of the preceding examples, wherein the conversation with the patient includes demographic information, reason for encounter, finding reported by the patient, previous questions and previous responses.

13. The method of any of the preceding examples, further comprising:

identifying medical entities in the text;

generating, with an expert system, candidate questions based on the identified medical entities;

reranking, with a machine-learned deep neural network reranker, the generated candidate questions based on the text; and presenting a first-ranked questions of the reranked questions or all of the reranked questions to a device.

14. The method of any of the preceding examples, wherein the text includes a history-taking dialogue and candidate history taking questions that are concatenated into a single text input for the reranker.

15. The method of any of the preceding examples, wherein the neural network reranker includes a Nystroformer.

16. The method of any of the preceding examples, wherein the Nystroformer is full attention.

17. The method of any of the preceding examples, wherein the neural network reranker includes a state-space model.

18. The method of any of the preceding examples, further comprising receiving a selection of the unranked generated candidate questions for each dialogue turn of the text and training the reranker based on the selections.

19. A non-transitory computer readable medium having stored thereon instructions to cause at least one processor to execute a method, the method comprising:

optionally receiving a digital speech signal;

optionally converting the digital speech signal to text;

performing self-alignment pre-training of an encoder on entities and their synonyms;

label attention training the pretrained encoder by aligning label-text joint representation to that of label synonym-text joint representations; and identifying, with the trained encoder, entities in a span in the text.

20. A system, comprising:

at least one processor; and a non-transitory computer readable medium having stored thereon instructions to cause the at least one processor to execute a method, the method comprising:

optionally receiving a digital speech signal;

optionally converting the digital speech signal to text;

performing self-alignment pre-training of an encoder on entities and their synonyms;

label attention training the pretrained encoder by aligning label-text joint representation to that of label synonym-text joint representations; and identifying, with the trained encoder, entities in a span in the text.

What is claimed is:

1. A method, comprising:

tracking, with a conversation tracker, a conversation with a user during an interaction related to a health of the user, the conversation tracker maintaining state during turns of the tracked conversation;

generating, by an emote classifier that was trained on an emote dataset, an emote representation based on the conversation with the user; and generating, by a large language model, based on the emote representation, an output to be used in the conversation that is responsive to the emote representation, wherein the output comprises a question that is both medically consistent with the conversation context and emotionally appropriate based on the emote representation, and wherein an emotional tone of the question adapts based on the emote representation such that the emotional tone varies in response to the user input in the conversation.

2. The method of claim 1, wherein the emote dataset comprises a set of emote phrases and corresponding emote representations and patient and medical professional dialogue turns that preceded the use of the emote phrase.

3. The method of claim 2, wherein the emote representations are one of affirmative, empathy, apology, and none.

4. The method of claim 1, further comprising training the large language model with a medical conversations dataset.

5. The method of claim 4, wherein the medical conversations dataset comprises dialogue context, next finding representations, emote representations, and medical finding questions with emotional responses.

6. The method of claim 1, wherein the tracked conversation includes demographic information, reason for encounter, finding reported by a patient, previous questions and previous responses.

7. A method of reranking, comprising:

identifying medical entities in a text;

generating candidate questions based on the identified medical entities;

reranking, with a machine-learned deep neural network reranker, the generated candidate questions based on the text;

presenting a first-ranked question of the reranked questions or all of the reranked questions to a device; and receiving a selection of unranked generated candidate questions and training the reranker based on the selection.

8. The method of claim 7, wherein the text includes a history-taking dialogue and candidate history taking questions that are concatenated into a single text input for the reranker.

9. The method of claim 7, wherein the neural network reranker includes a sequence model or state-space model.

10. The method of claim 7, wherein the neural network reranker includes a state-space model.

11. A non-transitory computer readable medium having stored thereon instructions to cause at least one processor to execute a method, the method comprising:

tracking, with a conversation tracker, a conversation with a user during an interaction related to a health of the user;

generating, by an emote classifier that was trained on an emote dataset, an emote representation based on the conversation with the user; and generating, by a large language model, based on the emote representation, an output to be used in the conversation that is responsive to the emote representation, wherein the output comprises a question that is both medically consistent with the conversation context and emotionally appropriate based on the emote representation, and wherein an emotional tone of the question adapts based on the emote representation such that the emotional tone varies in response to the user input in the conversation.

12. A system, comprising:

at least one processor; and a non-transitory computer readable medium having stored thereon instructions to cause the at least one processor to execute a method, the method comprising:

tracking, with a conversation tracker, a conversation with a user during an interaction related to a health of the user, the conversation tracker maintaining state during turns of the tracked conversation;

generating, by an emote classifier that was trained on an emote dataset, an emote representation based on the conversation with the user; and generating, by a large language model, based on the emote representation and the tracked conversation, an output to be used in the conversation that is responsive to the emote representation, wherein the output comprises a question that is both medically consistent with the conversation context and emotionally appropriate based on the emote representation, and wherein an emotional tone of the question adapts based on the emote representation such that the emotional tone varies in response to the user input in the conversation.

13. The system of claim 12, wherein the emote dataset comprises a set of emote phrases and corresponding emote representations and patient and medical professional dialogue turns that preceded the use of the emote phrase.

14. The system of claim 13, wherein the emote representations are one of affirmative, empathy, apology, and none.

15. The system of claim 12, wherein the method further comprises training the large language model a medical conversations dataset.

16. The system of claim 15, wherein the medical conversations dataset comprises dialogue context, next finding representations, emote representations, and medical finding questions with emotional responses.

17. The method of claim 1, wherein the output comprises a natural language question about a target finding.

18. The method of claim 17, wherein generating the output further comprises:

generating a next finding representation for a target finding based on patient demographics and findings; and generating the output based on both the next finding representation and the emote representation.

19. The method of claim 1, further comprising identifying medical entities in the conversation before generating the emote representation and the generating the output is further based on the identified medical entities.

* * * * *